US012490255B2

(12) United States Patent
Ding et al.

(10) Patent No.: US 12,490,255 B2
(45) Date of Patent: Dec. 2, 2025

(54) SIDELINK PARAMETER CONFIGURATION METHOD AND USER EQUIPMENT

(71) Applicant: GUANGDONG OPPO MOBILE TELECOMMUNICATIONS CORP., LTD., Guangdong (CN)

(72) Inventors: Yi Ding, Dongguan (CN); Shichang Zhang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 308 days.

(21) Appl. No.: 18/335,414

(22) Filed: Jun. 15, 2023

(65) Prior Publication Data
US 2023/0337221 A1 Oct. 19, 2023

Related U.S. Application Data

(63) Continuation of application No. PCT/CN2021/071915, filed on Jan. 14, 2021.

(51) Int. Cl.
*H04W 72/1263* (2023.01)
*H04W 72/25* (2023.01)
*H04W 76/28* (2018.01)

(52) U.S. Cl.
CPC ....... *H04W 72/1263* (2013.01); *H04W 72/25* (2023.01); *H04W 76/28* (2018.02)

(58) Field of Classification Search
CPC . H04W 72/1263; H04W 72/25; H04W 76/28; H04W 92/18; H04W 24/02; H04W 72/0446; H04W 76/14; Y02D 30/70
See application file for complete search history.

(56) References Cited

U.S. PATENT DOCUMENTS

| 2016/0366645 | A1 | 12/2016 | Song |
| 2017/0289940 | A1 | 10/2017 | Yang et al. |
| 2021/0051646 | A1* | 2/2021 | Maaref ................. H04W 72/02 |
| 2021/0059005 | A1* | 2/2021 | Hosseini ............... H04W 76/28 |

(Continued)

FOREIGN PATENT DOCUMENTS

| CN | 2018064477 A1 | 4/2018 |
| CN | 110945933 A | 3/2020 |

(Continued)

OTHER PUBLICATIONS

Huawei et al., "Consideration on the sidelink DRX for unicast, groupcast and broadcast", 3GPP TSG-RAN WG2 Meeting #112 electronic R2-2009413, Nov. 2-13, 2020, pp. 1-8.

(Continued)

Primary Examiner — Dady Chery
(74) Attorney, Agent, or Firm — PERKINS COIE LLP

(57) ABSTRACT

Disclosed are sidelink (SL) parameter configuration method and user equipment (UE). The method comprises: determining a recommended discontinuous reception (DRX) configuration of the first UE, the recommended DRX configuration depending on implementation of the first UE; sending the recommended DRX configurations to a second UE; receiving a configuration response from the second UE; determining a first DRX configuration of the first UE according to the configuration response; and discontinuously receiving, according to the first DRX configuration, data sent by the second UE.

14 Claims, 7 Drawing Sheets

(56) References Cited

U.S. PATENT DOCUMENTS

| | | | |
|---|---|---|---|
| 2022/0174781 A1 | 6/2022 | Yang | |
| 2022/0386408 A1* | 12/2022 | Li | H04W 76/38 |
| 2023/0014303 A1 | 1/2023 | Di Girolamo | |
| 2023/0068554 A1* | 3/2023 | Yang | H04W 52/0216 |
| 2023/0337140 A1 | 10/2023 | Miao | |
| 2024/0292485 A1* | 8/2024 | Yang | H04W 72/25 |

FOREIGN PATENT DOCUMENTS

| | | | |
|---|---|---|---|
| CN | 110945962 A | 3/2020 | |
| CN | 111670603 A | 9/2020 | |
| CN | 111699723 A | 9/2020 | |
| CN | 111800764 A | 10/2020 | |
| CN | 111800893 A | 10/2020 | |
| CN | 111800894 A | 10/2020 | |
| JP | 2017139658 A | 8/2017 | |
| WO | 2021119474 A1 | 6/2021 | |
| WO | 2021127866 A1 | 7/2021 | |

OTHER PUBLICATIONS

First Office Action of the Chinese application No. 202311406431.3, issued on Oct. 11, 2024. 28 pages with English translation.

First Office Action of the Japanese application No. 2023-540158, issued on Jan. 17, 2025. 8 pages with English translation.

Second Office Action of the European application No. 21918469.4, issued on Jan. 31, 2025. 6 pages.

Second Office Action of the Chinese application No. 202311406431.3, issued on Feb. 13, 2025. 21 pages with English translation.

International Search Report in the international application No. PCT/CN2021/071915, mailed on Oct. 15, 2021.

Written Opinion of the International Search Authority in the international application No. PCT/CN2021/071915, mailed on Oct. 15, 2021.

3GPP TSG RAN WG2#97 R2-1701309, Athens, Greece, Feb. 13-17, 2017, Agenda item: 9.1.3.2, Source: Intel Corporation, ITL, Title: DRX in sidelink, Document for: Discussion and decision.

3GPP TSG RAN WG1 Meeting #90 R1-1712982, Prague, Czechia, Aug. 21-25, 2017, Agenda Item: 5.2.9.2.3.2, Source: Sony, Title: Discussion on sidelink resource allocation and configuration, Document for: Discussion.

3GPP TS 38.331 V16.2.0 (Sep. 2020), 3rd Generation Partnership Project; Technical Specification Group Radio Access Network; NR; Radio Resource Control (RRC) protocol specification (Release 16).

Vivo: "SL DRX for groupcast broadcast and unicast", 3GPP TSG-RAN WG2 Meeting #112 electronic R2-2009833, E-Meeting, Nov. 2-13, 2020, XP052362880, pp. 1-5.

First Office Action of the European application No. 21918469.4, issued on Jul. 18, 2024, 8 pages.

OPPO: "Discussion on DRX for sidelink", 3GPP Draft; R2-2008772, 3RD Generation Partnership Project (3GPP), Mobile Competence Centre; 650, Route Des Lucioles; F-06921 Sophia-Antipolis Cedex; France, vol. RAN WG2, no. E-meeting; Nov. 1, 2020, Oct. 23, 2020 (Oct. 23, 2020), XP052361832, paragraph [04.2], figure 6. 7 pages.

Supplementary European Search Report in the European application No. 21918469.4, mailed on Jan. 5, 2024. 11 pages.

Office Action of the Indian application No. 202317044851, issued on Mar. 1, 2024. 6 pages with English translation.

Second Office Action of the Japanese application No. 2023-540158, issued on May 9, 2025. 8 pages with English translation.

Third Office Action of the Chinese application No. 202311406431.3, issued on Jun. 12, 2025. 24 pages with English translation.

* cited by examiner

SIDELINK PARAMETER CONFIGURATION METHOD AND USER EQUIPMENT

CROSS-REFERENCE TO RELATED APPLICATION

This application is a continuation application of International Patent Application No. PCT/CN2021/071915, filed on Jan. 14, 2021, the disclosure of which is hereby incorporated by reference in its entirety.

BACKGROUND

Discontinuous reception (DRX) is an energy-saving and power-saving method used in an uplink and downlink system. A UE listens to a physical downlink control channel (PDCCH) according to a DRX cycle configured by a network.

However, an existing DRX mechanism is a DRX mechanism for the uplink and downlink system. How to use DRX in device-to-device (D2D), vehicle-to-vehicle (V2V), vehicle-to-everything (V2X), and other communication systems realized by using an SL transmission technology has not been discussed.

SUMMARY

The embodiments of disclosure relate to the field of communications, and in particular, to a sidelink (SL) parameter configuration method and user equipment (UE).

According to a first aspect, an embodiment of the present disclosure provides an SL parameter configuration method, applied to a first UE, and including: determining a recommended discontinuous reception (DRX) configuration of the first UE, the recommended DRX configuration depending on implementation of the first UE; sending the recommended DRX configurations to a second UE; receiving a configuration response from the second UE; determining a first DRX configuration of the first UE according to the configuration response; and discontinuously receiving, according to the first DRX configuration, data sent by the second UE.

According to a second aspect, an embodiment of the present disclosure provides an SL parameter configuration method, applied to a second UE, and including: receiving a recommended discontinuous reception (DRX) configuration sent by a first UE; determining a first discontinuous reception (DRX) configuration of the first UE and generating a configuration response; and sending the configuration response to the first UE, such that the first UE discontinuously receives, according to the first DRX configuration determined by the configuration response, data sent by the second UE.

According to a third aspect, an embodiment of the present disclosure provides a first user equipment (UE) comprising a processor and a memory for storing a computer program capable of running on the processor, wherein the processor is configured to execute the computer program to perform operations of: determining a recommended discontinuous reception (DRX) configuration of the first UE, the recommended DRX configuration depending on implementation of the first UE; sending the recommended DRX configurations to a second UE; receiving a configuration response from the second UE; determining a first DRX configuration of the first UE according to the configuration response; and discontinuously receiving, according to the first DRX configuration, data sent by the second UE.

According to a fourth aspect, an embodiment of the present disclosure provides a second user equipment (UE), comprising a processor and a memory for storing a computer program capable of running on the processor, wherein the processor is configured to execute the computer program to perform operations of: receiving a recommended discontinuous reception (DRX) configuration sent by a first UE; determining a first discontinuous reception (DRX) configuration of the first UE and generating a configuration response; and sending the configuration response to the first UE, such that the first UE discontinuously receives, according to the first DRX configuration determined by the configuration response, data sent by the second UE.

DETAILED DESCRIPTION

The technical solutions in the embodiments of the application are described below with reference to the accompanying drawings in the embodiments of the application. It is apparent that the described embodiments are merely some rather than all of the embodiments of the application. All other embodiments obtained by those of ordinary skill in the art according to the embodiments of the application without creative efforts should fall within the protection scope of the application.

Figure 1:
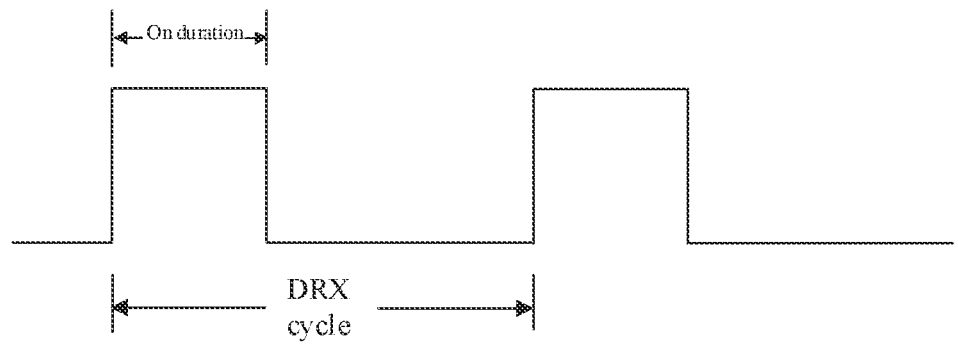
FIG. 1 is a schematic diagram of a discontinuous cycle.

In an uplink and downlink system, a UE listens to a PDCCH only in an on-duration period of a DRX cycle, and can enter a dormant state in a remaining period of the DRX cycle. The DRX cycle is periodic, as shown in FIG. 1. Only one type of DRX Cycle or two types of DRX cycles including a long DRX cycle (LDC) and a short DRX cycle (SDC) may be configured for a network. FIG. 1 shows a case that only one type of DRX cycle is available. In this case, the DRX cycle is the LDC, in other words, only the LDC is configured for the network.

The technical solutions in the embodiments of the application may be applied to D2D, V2V, V2X, and other communication systems realized by using an SL transmission technology. The SL transmission technology is different from a technology in which communication data is received or sent by a base station in a traditional cellular system. This D2D direct communication mode has a higher spectral efficiency and a lower transmission delay. For D2D communication, the 3rd Generation Partnership Project (3GPP) defines two transmission modes: a mode A and a mode B.

Figure 2:
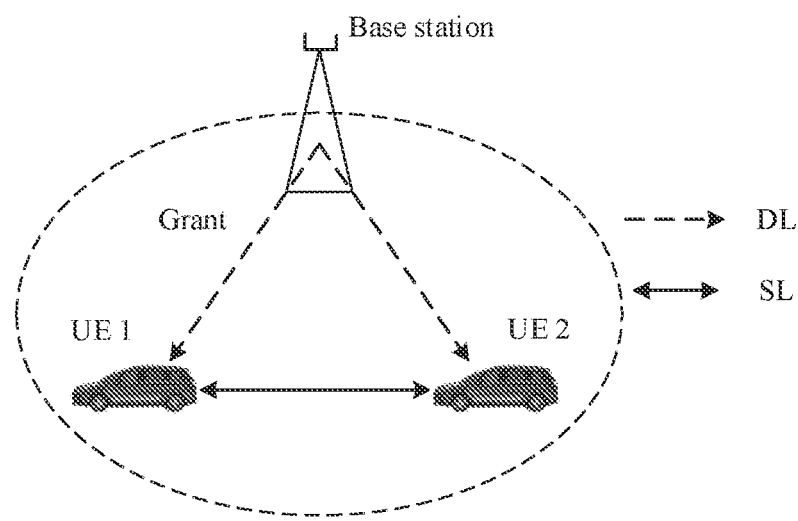
FIG. 2 is a schematic diagram of a first D2D communication mode.

In the mode A (as shown in FIG. 2), transmission resources of a device 1 and a device 2 are allocated by the base station, and the two devices transmit data on an SL according to the resources allocated by the base station. The base station may allocate a single-transmission or semi-static transmission resource for the device.

Figure 3:
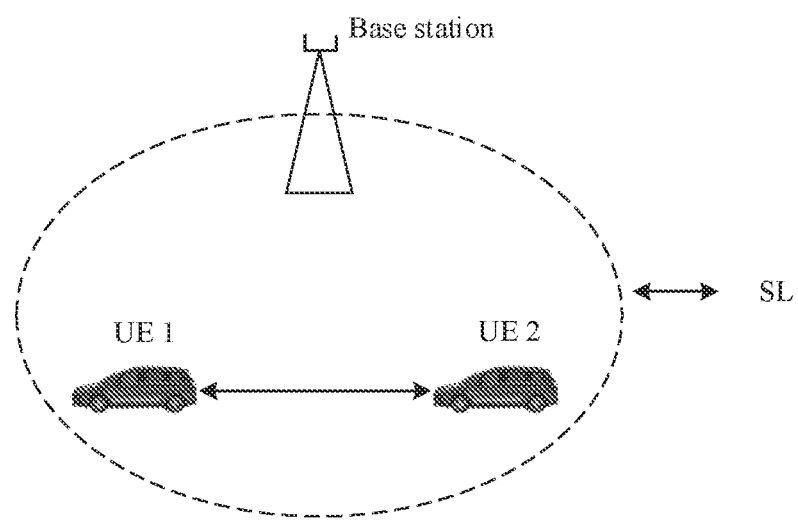
FIG. 3 is a schematic diagram of a second D2D communication mode.

In the mode B (as shown in FIG. 3), the two devices select one resource from a resource pool to perform data transmission. Specifically, the device may select the transmission resource in the resource pool in a listening manner or randomly.

In the above listening manner, according to resource listening in a past period of time (including decoding first SL control information and measured sidelink-reference signal received power (SL-RSRP) that are sent by another device, the device excludes a corresponding resource in a resource selection window, and selects a resource from a remaining resource that is never excluded, to perform transmission.

Figure 4:
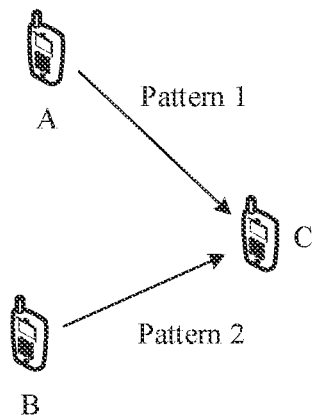
FIG. 4 is a schematic diagram of a D2D communication framework.
Figure 5:
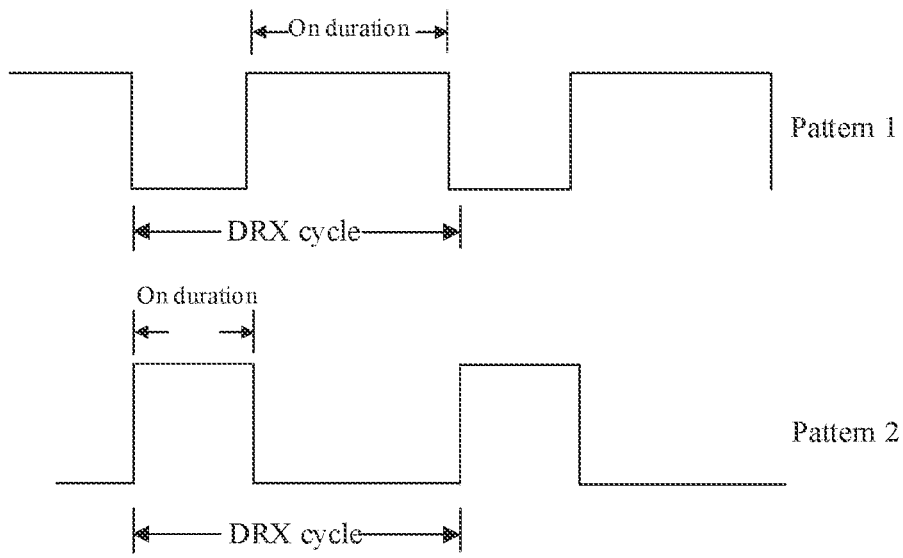
FIG. 5 is a schematic diagram comparing two different discontinuous cycles.

In the SL, a transmitting end configures a DRX pattern for a receiving end. It is assumed that there is a unicast or multicast service between one receiving end and a plurality of transmitting ends, and the transmitting ends configure different DRX patterns for the same receiving end. As a result, the receiving end is likely to always remain a listening state and unable to enter the dormant state. As shown in FIG. 4, a UE A and a UE B each have a unicast connection to a UE C. The UE A and the UE B do not know existence of each other, and respectively configure a DRX pattern 1 and a DRX pattern 2 for the UE C. If the DRX pattern 1 and the DRX pattern 2 are orthogonal (as shown in FIG. 5), the UE C is always in an on-duration state, always listens to a PSCCH and/or a PSSCH, and cannot enter the dormant state, thereby consuming more electricity.

It is to be understood that the terms "system" and "network" in this specification can be exchanged. The term "and/or" in this specification merely describes an association relationship between associated objects, and indicates that three types of relationships may exist. For example, A and/or B may indicate that A exists alone, A and B coexist, or B exists alone. In addition, the character "/" in this specification generally indicates that the associated objects are in an "or" relationship.

The embodiments of the application provide an SL parameter configuration method. The SL parameter configuration method is applied to a UE, and the UE may be any UE that performs communication by using an SL. In order to understand the characteristics and technical content of the embodiments of the disclosure in more detail, implementation of the embodiments of the disclosure is described in detail below in combination with the accompanying drawings. The accompanying drawings are for reference only, and are not intended to limit the embodiments of the disclosure.

Figure 6:
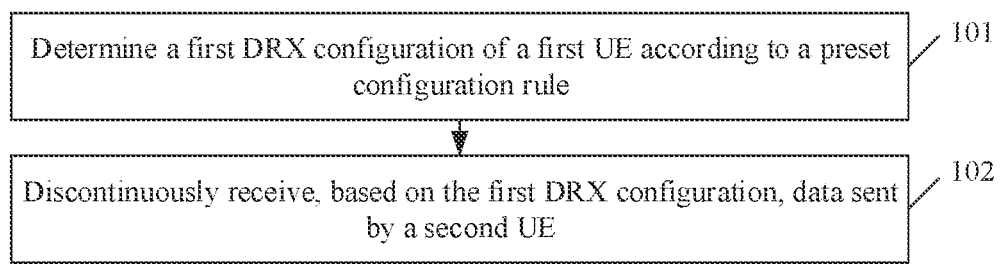
FIG. 6 is a first schematic flowchart of an SL parameter configuration method according to an embodiment of the present disclosure.

The embodiments of the disclosure provide an SL parameter configuration method, applied to a first UE. FIG. 6 is a first schematic flowchart of the SL parameter configuration method according to the embodiments of the application. As shown in FIG. 6, the SL parameter configuration method includes the following steps.

In step 101, a first DRX configuration of the first UE is determined according to a preset configuration rule.

It is to be noted that the preset configuration rule is used to limit a selection range of DRX configuration information of the first UE. The preset configuration rule is used to pre-plan a DRX configuration range to limit a selectable DRX configuration to a small range. In this way, responsive to the first UE performs DRX for another UE as a receiving end, the first UE can select the first DRX configuration in a small DRX configuration range. This avoids a case that the first UE is continuously in a listening state and fails to enter a dormant state because different UEs specify different DRX configurations for the first UE. In this way, it is ensured that the first UE has a sufficient period of dormancy, thus reducing an energy consumption of the first UE.

In a practical application, the preset configuration rule may be any rule that limits a DRX configuration selection range.

In some embodiments, the operation that the first DRX configuration of the first UE is determined according to the preset configuration rule includes that: a recommended DRX configuration of the first UE is determined; and the first DRX configuration of the first UE is determined according to the recommended DRX configuration.

Herein, the preset configuration rule is that a second UE (also referred to as a UE 2) generates the first DRX configuration according to the recommended DRX configuration of the first UE (also referred to as a UE 1), the second UE sends the first DRX configuration to the first UE, and the first UE performs DRX according to the first DRX configuration. The recommended DRX configuration of the first UE may be specified or pre-specified by a network device for the first UE, or the recommended DRX configuration depends on implementation of the first UE. For example, responsive to the first UE is connected to another UE, the recommended DRX configuration is obtained according to a DRX configuration corresponding to the connection.

It is to be noted that the first UE is used as the receiving end, and the second UE is used as a transmitting end. The receiving end can discontinuously receive data from a plurality of transmitting ends, in other words, the first UE corresponds to at least one second UE. A DRX configuration corresponding to each connection between the first UE and the second UE can be determined using the parameter configuration method provided in the embodiments of the application.

In some other embodiments, the operation that the first DRX configuration of the first UE is determined according to the preset configuration rule includes that: the first DRX configuration determined by the second UE according to geographic location information or cell information is received.

Here, the preset configuration rule is that the second UE determines the first DRX configuration according to its own geographic location or cell. In a practical application, a network may divide a geographic location into a plurality of geographical zones in advance, and then specify at least one DRX configuration for each geographical zone. A geographical zone of the second UE is determined according to the geographic location of the second UE, which is represented by a zone or a zone ID. Then at least one corresponding DRX configuration is determined according to the zone or the zone ID. If a plurality of DRX configurations are determined, one of the DRX configurations is determined as the first DRX configuration. The network may divide a cell into a plurality of cell groups in advance, and then specify at least one DRX configuration for each cell group. A cell group of the second UE is determined according to the cell information of the second UE, which is represented by a cell group or a cell group ID. Then at least one corresponding DRX configuration is determined according to the cell group or the cell group ID. If a plurality of DRX configurations are determined, one of the DRX configurations is determined as the first DRX configuration. The network may alternatively specify at least one DRX configuration for a cell directly. Then the second UE determines at least one corresponding DRX configuration according to its own cell or cell ID. If a plurality of DRX configurations are determined, one of the DRX configurations is determined as the first DRX configuration.

In this way, the preset configuration rule is used to pre-plan the DRX configuration range to limit the selectable DRX configuration to the small range. Responsive to the first UE performs DRX for another UE as the receiving end, the first UE can select the first DRX configuration in the small DRX configuration range. This avoids a case the first UE is continuously in the listening state and fails to enter the dormant state because different UEs specify different DRX configurations for the first UE. In this way, it is ensured that the first UE has the sufficient period of dormancy, thus reducing the energy consumption of the first UE.

In step 102, data sent by the second UE is discontinuously received according to the first DRX configuration.

In some embodiments, the DRX configuration (including the recommended DRX configuration, the first DRX configuration, a second DRX configuration, and another DRX configuration in the embodiments of the application) includes at least one of a first parameter, a second parameter, a third parameter, a fourth parameter, a fifth parameter, or a sixth parameter.

The first parameter is used to indicate a first time length, and the first time length is a time length during which the first UE listens to a PSCCH and/or a PSSCH in a DRX cycle.

The second parameter is used to indicate a second time length, and the second time length is a time length during which the first UE needs to continuously listen to the PSCCH and/or the PSSCH after listening to the PSCCH and/or the PSSCH.

The third parameter is used to indicate a third time length and/or a first offset, the third time length is a time length of an LDC, and the first offset is a time offset relative to a time-domain reference point 1.

The fourth parameter is used to indicate a second offset, and the second offset is a timeslot-level offset of the LDC and/or a timeslot-level offset of an SDC.

The fifth parameter is used to indicate a fourth time length, and the fourth time length is a time length of the SDC.

The sixth parameter is used to indicate a first cycle quantity, and the first UE fails to listen to the PSCCH and/or the PSSCH in an SDC indicated by the first cycle quantity, and is ready to enter an LDC.

For example, the first parameter (drx-onDurationTimer) is used to indicate a time length of an on-duration state. If two types of DRX cycles are configured, time lengths of the on-duration state in the two types of DRX cycles are the same. In both the LDC and the SDC, the on-duration state is followed by the dormant state. The first parameter is in $\frac{1}{32}$ milliseconds, or in milliseconds.

The second parameter (drx-InactivityTimer) is used to indicate a time length during which a UE should continuously listen to uplink and downlink scheduling or transmission after receiving the PSCCH and/or the PSSCH. Assuming that the UE obtains the PSCCH and/or the PSSCH in a last timeslot of an on-duration period through listening, the UE will enter the dormant state in a next timeslot. If data scheduled by the PSCCH and/or the PSSCH is not in a current timeslot, or retransmission indicated by the PSCCH and/or the PSSCH is not completed in the current timeslot, the UE cannot receive data after entering the dormant state. Therefore, before entering the dormant state, the UE should continue to wait for a period of time after obtaining the PSCCH and/or the PSSCH through listening (in other words, continue to listen to the uplink and downlink scheduling or transmission). A length of this period of time is the time length indicated by the second parameter. The second parameter is in milliseconds.

The third parameter (drx-LongCycleStartOffset) is used to indicate the time length of the LDC, and an offset relative to the time-domain reference point 1, which is denoted as drxStartOffset. Optionally, the above time-domain reference point 1 is a system frame number (SFN) 0, a start boundary of the SFN 0, a first timeslot in the SFN 0, or a first subframe in the SFN 0. The offset drxStartOffset is used to determine a time-domain start position of the LDC and/or a time-domain start position of the SDC. The two parameters are in milliseconds.

The fourth parameter (drx-SlotOffset) is used to indicate the timeslot-level offset of the LDC and/or the timeslot-level offset of the SDC. Because the above parameters are all in milliseconds, one millisecond (one subframe) can be equal to a plurality of timeslots in NR. This is related to a subcarrier interval. For example, responsive to the subcarrier interval is 15 kHz/30 kHz/60 kHz/120 kHz, one millisecond corresponds to 1/2/4/8 timeslots. The fourth parameter is introduced in the NR to describe a timeslot of a start position of the LDC and/or a timeslot of a start position of the SDC. The fourth parameter is in $\frac{1}{32}$ milliseconds.

The fifth parameter (drx-ShortCycle) is used to indicate the time length of the SDC. The fifth parameter is in milliseconds. It is to be noted that the fifth parameter is an optional configuration parameter.

The sixth parameter (drx-ShortCycleTimer) is used to indicate a quantity of SDCs after which the UE is ready to enter the LDC if it does not obtain the PSCCH and/or the PSSCH through listening. It is to be noted that the sixth parameter is an optional configuration parameter.

The following illustrates a working mechanism of the above DRX configuration in an SL system by using an example.

It is assumed that the subcarrier interval is 15 kHz, one subframe is equal to one millisecond, and one subframe contains only one timeslot.

The parameters in the DRX configuration are set as follows: drx-onDurationTimer is set to 2 ms, drx-InactivityTimer is set to 2 ms, drx-LongCycleStartOffset is set to 10 ms for the LDC, drxStartOffset is set to 1 ms, drx-SlotOffset is set to 0 ms, drx-ShortCycle is set to 5 ms, and drx-ShortCycleTimer is set to 2.

Figure 7:
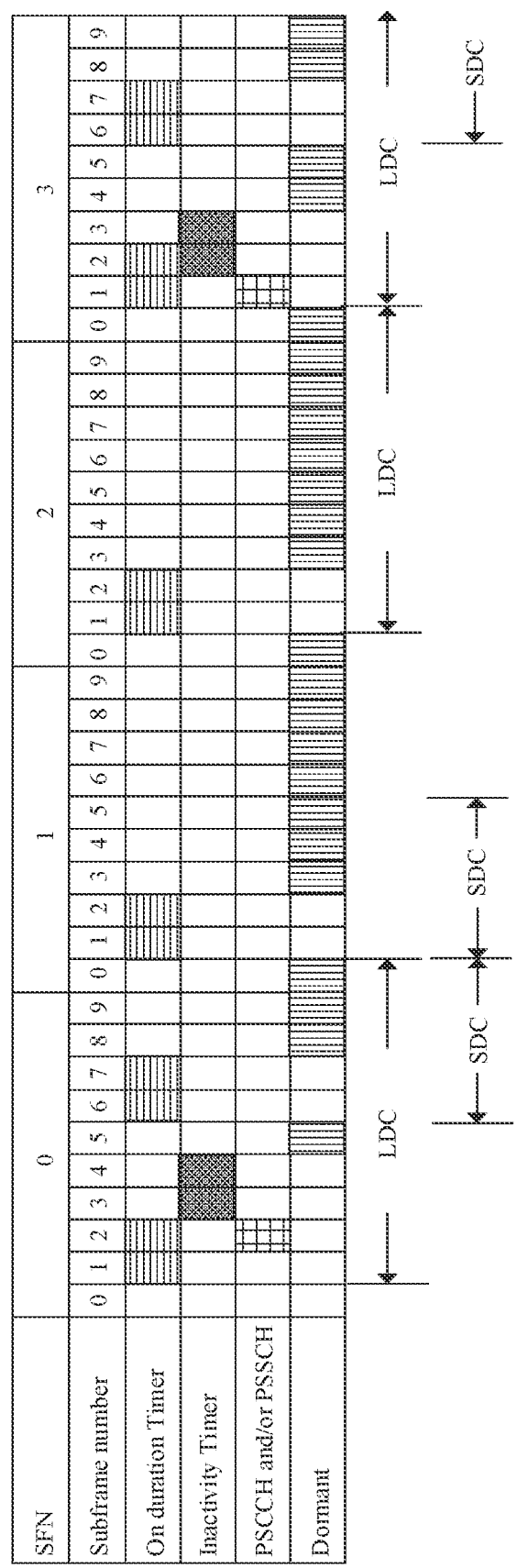
FIG. 7 is a schematic diagram of a DRX configuration according to an embodiment of the present disclosure.

FIG. 7 is a schematic diagram of the DRX configuration in the embodiments of the application. As shown in FIG. 7, an SFN is short for a system frame number, an on-duration timer is configured to perform timing for the first time length in the first parameter, an inactivity timer is configured to perform timing for the second time length in the second parameter, the PSCCH and/or the PSSCH mean/means PSCCH listening, PSSCH listening, or PSCCH and PSSCH listening in the on-duration state. Specifically, a subframe 1 of an infinite frame 0 is denoted as (0, 1). At (0, 1), the UE (namely, the first UE) meets a condition for entering the LDC, so at (0, 1) and (0, 2), the on-duration state is available. The UE obtains the PSCCH and/or the PSSCH through listening at (0, 2), and starts the inactivity timer, so the UE continuously listens to the PSCCH and/or the PSSCH at (0, 3) and (0, 4). After the inactivity timer expires, the UE is ready to enter the SDC first. At (0, 6), the UE meets a condition for entering the SDC, and then enters the SDC for a plurality of times. Because the parameter drx-ShortCycleTimer is set to 2, the UE does not obtain the PSCCH and/or the PSSCH in two consecutive SDCs (namely, from (0, 6) to (1, 5)) through listening, and the UE is ready to enter the LDC. At (2, 1), the UE meets the condition for entering the LDC, and no PSCCH and/or PSSCH are/is obtained through listening in this cycle. At (3, 1), the UE enters the LDC again and starts the on-duration state. At (3, 1), the UE obtains the PSCCH and/or the PSSCH through listening, starts the inactivity timer again, and selects to enter the SDC.

In some embodiments, the above condition for entering the LDC is as follows: [SFN*10+subframe number] mod (time length of the LDC)=drxStartOffset. In other words, a periodic start subframe position of the LDC is [SFN*10+subframe number] mod (time length of the LDC)=drxStartOffset. For example, in FIG. 7, the UE can enter the LDC at subframes (0, 1), (1, 1), (2, 1), and (3,1).

The above condition for entering the SDC is as follows: [SFN*10+subframe number] mod (time length of the SDC) =drxStartOffset mod (time length of the SDC). In other words, a periodic start subframe position of the SDC is [SFN*10+subframe number] mod (time length of the SDC) =drxStartOffset mod (time length of the SDC). For example, in FIG. 7, the UE can enter the SDC at subframes (0, 1), (0, 6), (1, 1), (1, 6), (2, 1), (2, 6), (3, 1), and (3, 6).

Optionally, a start position of a specific timeslot granularity can be deviated according to the above configuration parameter drx-SlotOffset if a start subframe position is determined.

According to the above solutions, the DRX configuration range is pre-planned according to the preset configuration rule, and the selectable DRX configuration is limited to the small range. The first DRX configuration determined for the first UE according to the preset configuration rule can resolve a problem that different UEs specify different DRX configurations for the first UE, thereby preventing the first UE from being always in the on-duration state, and reducing the energy consumption.

Figure 8:
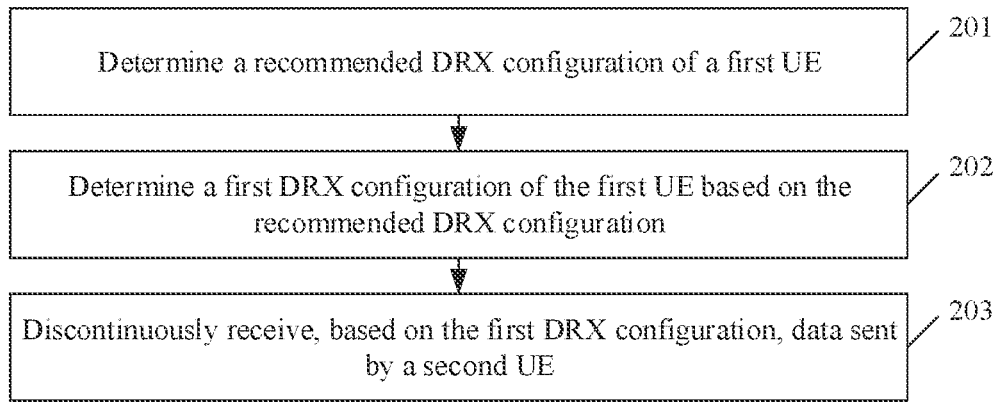
FIG. 8 is a second schematic flowchart of an SL parameter configuration method according to an embodiment of the present disclosure.

The following further describes, by using an example, how to determine the first DRX configuration in the embodiments of the application. FIG. 8 is a second schematic flowchart of the SL parameter configuration method according to the embodiments of the application. As shown in FIG. 8, the SL parameter configuration method includes the following steps.

In step 201, the recommended DRX configuration of the first UE is determined.

Herein, the preset configuration rule is that the second UE (also referred to as the UE 2) generates a configuration response according to the recommended DRX configuration of the first UE (also referred to as the UE 1), the second UE sends the configuration response to the first UE, and the first UE performs DRX according to the first DRX configuration.

Specifically, the recommended DRX configuration of the first UE may be determined in the following at least three manners.

In a manner 1, the operation that the recommended DRX configuration of the first UE is determined includes that: responsive to there is at least one connection between the first UE and at least one another UE, the recommended DRX configuration is determined according to at least one DRX configuration corresponding to the at least one connection.

In other words, responsive to the first UE determines the recommended DRX configuration for the second UE, the at least one DRX configuration corresponding to the at least one connection can be used as a reference.

In some embodiments, the operation that the recommended DRX configuration is determined according to the at least one DRX configuration corresponding to the at least one connection includes that: responsive to there is one connection, a target parameter of a corresponding DRX configuration is taken as a target parameter of the recommended DRX configuration; responsive to there are at least two connections, a target parameter of one of at least two corresponding DRX configurations is taken as a target parameter of the recommended DRX configuration; or responsive to there are at least two connections, a target parameter of the recommended DRX configuration is determined according to at least two target parameters of at least two corresponding DRX configurations.

In other words, different connection quantities correspond to different determining methods. Responsive to there is the one connection, only one reference DRX configuration is available, and the target parameter of the recommended DRX configuration is determined according to a target parameter of the reference DRX configuration. Herein, the target parameter is any parameter in the DRX configuration. For example, the target parameter is the first parameter, the second parameter, the third parameter, the fourth parameter, the fifth parameter, or the sixth parameter.

Responsive to there are the at least two connections, one target parameter of the at least two DRX configurations is taken as the target parameter of the recommended DRX configuration; or the target parameter of the recommended DRX configuration is determined according to two or more target parameters of the at least two DRX configurations. For example, a target parameter of any or a specific DRX configuration of the two DRX configurations may be selected.

In some embodiments, the operation that the target parameter of the recommended DRX configuration is determined according to the at least two target parameters of the at least two DRX configurations includes that:
- a maximum value of the at least two target parameters is taken as the target parameter of the recommended DRX configuration; or
- a minimum value of the at least two target parameters is taken as the target parameter of the recommended DRX configuration; or
- an average value of the at least two target parameters is taken as the target parameter of the recommended DRX configuration; or
- a parameter with a largest quantity in the at least two target parameters is taken as the target parameter of the recommended DRX configuration; or
- a greatest common divisor of the at least two target parameters is taken as the target parameter of the recommended DRX configuration; or
- a least common multiple of the at least two target parameters is taken as the target parameter of the recommended DRX configuration.

In some embodiments, the DRX configuration (including the recommended DRX configuration, the first DRX configuration, the second DRX configuration, and the another DRX configuration in the embodiments of the application) includes the at least one of the first parameter, the second parameter, the third parameter, the fourth parameter, the fifth parameter, or the sixth parameter.

The first parameter is used to indicate the first time length, and the first time length is the time length during which the first UE listens to the PSCCH and/or the PSSCH in the DRX cycle.

The second parameter is used to indicate the second time length, and the second time length is the time length during which the first UE needs to continuously listen to the PSCCH and/or the PSSCH after listening to the PSCCH and/or the PSSCH.

The third parameter is used to indicate the third time length and/or the first offset, the third time length is the time length of the LDC, and the first offset is the time offset relative to the time-domain reference point 1.

The fourth parameter is used to indicate the second offset, and the second offset is the timeslot-level offset of the LDC and/or the timeslot-level offset of the SDC.

The fifth parameter is used to indicate the fourth time length, and the fourth time length is the time length of the SDC.

The sixth parameter is used to indicate the first cycle quantity, and the first UE fails to listen to the PSCCH and/or the PSSCH in the SDC indicated by the first cycle quantity, and is ready to enter the LDC.

Herein, the method for determining the target parameters is also a method for determining the time length or the offset in the target parameter.

Specifically, responsive to the first parameter is determined, the first time length may depend on a network configuration or pre-configuration, or depend on UE implementation or a preset value specified by a standard.

Optionally, it is assumed that the UE 1 already has one unicast or multicast connection to another UE, which is denoted as a connection 1. The first time length is a first time length indicated by a DRX configuration corresponding to the connection 1.

Optionally, it is assumed that the UE 1 already has a plurality of unicast or multicast connections to another UE, which are denoted as connections 1 to N. The first time length is a first time length indicated by a DRX configuration corresponding to one of the connections 1 to N. Alternatively, the first time length is a maximum value, a minimum value, an average value, a greatest common divisor, or a least common multiple of first time lengths indicated by DRX configurations corresponding to a plurality of connections among the connections 1 to N, or is a first time length that is most frequently indicated by DRX configurations corresponding to a plurality of connections among the connections 1 to N. The connections 1 to N may be partially unicast and partially multicast.

Responsive to the second parameter is determined, the second time length may depend on a network configuration or pre-configuration, or depend on UE implementation or a preset value specified by a standard.

Optionally, it is assumed that the UE 1 already has one unicast or multicast connection to another UE, which is denoted as a connection 1. The second time length is a second time length indicated by a DRX configuration corresponding to the connection 1.

Optionally, it is assumed that the UE 1 already has a plurality of unicast or multicast connections to another UE, which are denoted as connections 1 to N. The second time length is a second time length indicated by a DRX configuration corresponding to one of the connections 1 to N. Alternatively, the second time length is a maximum value, a minimum value, an average value, a greatest common divisor, or a least common multiple of second time lengths indicated by DRX configurations corresponding to a plurality of connections among the connections 1 to N, or is a second time length that is most frequently indicated by DRX configurations corresponding to a plurality of connections among the connections 1 to N. The connections 1 to N may be partially unicast and partially multicast.

Responsive to the third parameter is determined, the above time-domain reference point 1 is the SFN 0, the start boundary of the SFN 0, the first timeslot in the SFN 0, or the first subframe in the SFN 0. The above first offset is used to determine the time-domain start position of the LDC and/or the time-domain start position of the SDC.

Optionally, the third time length may depend on a network configuration or pre-configuration, or depend on UE implementation or a preset value specified by a standard.

Optionally, it is assumed that the UE 1 already has one unicast or multicast connection to another UE, which is denoted as a connection 1. The third time length is a third time length indicated by a DRX configuration corresponding to the connection 1.

Optionally, it is assumed that the UE 1 already has a plurality of unicast or multicast connections to another UE, which are denoted as connections 1 to N. The third time length is a third time length indicated by a DRX configuration corresponding to one of the connections 1 to N. Alternatively, the third time length is a maximum value, a minimum value, an average value, a greatest common divisor, or a least common multiple of third time lengths indicated by DRX configurations corresponding to a plurality of connections among the connections 1 to N, or is a third time length that is most frequently indicated by DRX configurations corresponding to a plurality of connections among the connections 1 to N. (The connections 1 to N may be partially unicast and partially multicast.)

Optionally, the first offset may depend on a network configuration or pre-configuration, or depend on UE implementation or a preset value specified by a standard. Optionally, the first offset is 0. Optionally, it is assumed that the UE 1 already has one unicast or multicast connection to another UE, which is denoted as a connection 1. The first offset is a first offset indicated by a DRX configuration corresponding to the connection 1.

Optionally, it is assumed that the UE 1 already has a plurality of unicast or multicast connections to another UE, which are denoted as connections 1 to N. The first offset is a first offset indicated by a DRX configuration corresponding to one of the connections 1 to N. Alternatively, the first offset is a maximum value, a minimum value, an average value, a greatest common divisor, or a least common multiple of first offsets indicated by DRX configurations corresponding to a plurality of connections among the connections 1 to N, or is a first offset that is most frequently indicated by DRX configurations corresponding to a plurality of connections among the connections 1 to N. The connections 1 to N may be partially unicast and partially multicast.

Responsive to the fourth parameter is determined, the second offset may depend on a network configuration or pre-configuration, or depend on UE implementation or a preset value specified by a standard. Optionally, the second offset is 0. Optionally, it is assumed that the UE 1 already has one unicast or multicast connection to another UE, which is denoted as a connection 1. The second offset is a second offset indicated by a DRX configuration corresponding to the connection 1.

Optionally, it is assumed that the UE 1 already has a plurality of unicast or multicast connections to another UE, which are denoted as connections 1 to N. The second offset is a second offset indicated by a DRX configuration corresponding to one of the connections 1 to N. Alternatively, the second offset is a maximum value, a minimum value, an average value, a greatest common divisor, or a least common multiple of second offsets indicated by DRX configurations corresponding to a plurality of connections among the connections 1 to N, or is a second offset that is most frequently indicated by DRX configurations corresponding to a plurality of connections among the connections 1 to N. The connections 1 to N may be partially unicast and partially multicast.

Assuming that the subcarrier interval is 30 kHz, and one subframe contains two timeslots, the start position, determined according to the third parameter, of the LDC is a subframe 5, a subframe 10, or a subframe 15. If a length of a value indicated by the fourth parameter is equal to one timeslot, the start position of the LDC is a second timeslot in the subframe 5, a second timeslot in the subframe 10, or a second timeslot in the subframe 15.

Responsive to the fifth parameter is determined, the fourth time length may depend on a network configuration or pre-configuration, or depend on UE implementation or a preset value specified by a standard.

Optionally, it is assumed that the UE 1 already has one unicast or multicast connection to another UE, which is denoted as a connection 1, and a DRX configuration corresponding to the connection 1 indicates the fourth time length. The fourth time length is the fourth time length indicated by the DRX configuration corresponding to the connection 1. For example, the unicast or multicast connection is a PC5 radio resource control (PC5 RRC) connection.

Optionally, it is assumed that the UE 1 already has a plurality of unicast or multicast connections to another UE, which are denoted as connections 1 to N. The fourth time length is a fourth time length indicated by a DRX configuration corresponding to one of the connections 1 to N. Alternatively, the fourth time length is a maximum value, a minimum value, an average value, a greatest common divisor, or a least common multiple of fourth time lengths indicated by DRX configurations corresponding to a plurality of connections among the connections 1 to N, or is a fourth time length that is most frequently indicated by DRX configurations corresponding to a plurality of connections among the connections 1 to N. The connections 1 to N may be partially unicast and partially multicast.

Responsive to the fifth parameter is determined, the first cycle quantity may depend on a network configuration or pre-configuration, or depend on UE implementation or a preset value specified by a standard. Optionally, the first cycle quantity is 0. Optionally, it is assumed that the UE 1 already has one unicast or multicast connection to another UE, which is denoted as a connection 1, and a DRX configuration corresponding to the connection 1 indicates the first cycle quantity. The first cycle quantity is the first cycle quantity indicated by the DRX configuration corresponding to the connection 1.

Optionally, it is assumed that the UE 1 already has a plurality of unicast or multicast connections to another UE, which are denoted as connections 1 to N. The first cycle quantity is a first cycle quantity indicated by a DRX configuration corresponding to one of the connections 1 to N. Alternatively, the first cycle quantity is a maximum value, a minimum value, an average value, a greatest common divisor, or a least common multiple of first cycle quantities indicated by DRX configurations corresponding to a plurality of connections among the connections 1 to N, or is a first cycle quantity that is most frequently indicated by DRX configurations corresponding to a plurality of connections among the connections 1 to N. The connections 1 to N may be partially unicast and partially multicast.

In a manner 2, the operation that the recommended DRX configuration of the first UE is determined includes that: the recommended DRX configuration is determined according to a network device configuration or pre-configuration.

Specifically, the recommended DRX configuration is determined according to a periodic network configuration or a non-periodic network configuration. For example, the above network pre-configuration may be that a DRX configuration solidified on a chip before the UE leaves a factory is taken as the recommended DRX configuration, or that the network specifies a DRX configuration for the UE responsive to the UE is within coverage of a base station, and the UE still uses the DRX configuration previously specified by the base station as the recommended DRX configuration if the UE moves to a region not covered by the network. Alternatively, the recommended DRX configuration is determined according to implementation of the first UE. The first UE itself determines the recommended DRX configuration according to a specific communication condition.

In a manner 3, the operation that the recommended DRX configuration of the first UE is determined includes that: the recommended DRX configuration is determined according to geographic location information or cell information of the first UE.

In this way, the preset configuration rule is used to pre-plan the DRX configuration range to limit the selectable DRX configuration to the small range. Responsive to the first UE performs DRX for another UE as the receiving end, the first UE can select the first DRX configuration in the small DRX configuration range. This avoids the case that the first UE is continuously in the listening state and fails to enter the dormant state because different UEs specify different DRX configurations for the first UE. In this way, it is ensured that the first UE has the sufficient period of dormancy, thus reducing the energy consumption of the first UE.

In some embodiments, the operation that the recommended DRX configuration is determined according to the geographic location information or the cell information of the first UE includes that: at least one corresponding DRX configuration is found in a first correspondence according to the geographic location information of the first UE, and the recommended DRX configuration is determined from the at least one DRX configuration; or at least one corresponding DRX configuration is found in a second correspondence according to the cell information of the first UE, and the recommended DRX configuration is determined from the at least one DRX configuration. The first correspondence includes a correspondence between the geographic location information and the DRX configuration, and the second correspondence includes a correspondence between the cell information and the DRX configuration.

In some embodiments, the operation that the recommended DRX configuration is determined from the at least one DRX configuration includes that: one DRX configuration is selected from the at least one DRX configuration as the recommended DRX configuration according to a type, a cycle, or a priority of a received service; or one DRX configuration is randomly selected from the at least one DRX configuration as the recommended DRX configuration.

In a practical application, the network may divide the geographic location into the plurality of geographical zones in advance, and then specify the at least one DRX configuration for each geographical zone. A geographical zone of the first UE is determined according to a geographic location of the first UE (which is represented by a zone or a zone ID). Then at least one corresponding DRX configuration is determined according to the zone or the zone ID. If a plurality of DRX configurations are determined, one of the DRX configurations is determined as the recommended DRX configuration. The network may divide the cell into the plurality of cell groups in advance, and then specify the at least one DRX configuration for each cell group. A cell group of the first UE is determined according to the cell information of the first UE (which is represented by a cell group or a cell group ID). Then at least one corresponding DRX configuration is determined according to the cell group or the cell group ID. If a plurality of DRX configurations are determined, one of the DRX configurations is determined as the recommended DRX configuration. The network may alternatively specify at least one DRX configuration for a cell directly. Then the first UE determines at least one corresponding DRX configuration according to its own cell or cell ID. If a plurality of DRX configurations are determined, one of the DRX configurations is determined as the recommended DRX configuration.

For example, the UE 1 determines the at least one DRX configuration according to the first correspondence. The first correspondence includes a correspondence between the geographical zone or the zone ID and the at least one DRX configuration. The second correspondence includes a correspondence between the cell or the cell ID and the at least one DRX configuration. The above DRX configuration includes the at least one of the first parameter, the second parameter, the third parameter, the fourth parameter, the fifth parameter, or the fifth parameter. The first correspondence and the second correspondence are configured or pre-configured by the network.

Further, the UE 1 first determines its own geographic location according to a positioning system, determines its own geographical zone according to its own geographic location, and then determines the at least one DRX configuration according to the zone or the zone ID and the first correspondence. If the UE 1 determines the plurality of DRX configurations, the UE 1 determines one DRX configuration from the DRX configurations. For example, the UE 1 randomly determines one DRX configuration from the DRX configurations, or the UE 1 determines one DRX configuration from the DRX configurations according to the type (such as a periodic or non-periodic service), the cycle, or the priority of the received service. Division information of the above geographical zone, for example, a length, a width, absolute or relative offsets of a longitude and a latitude, precision, and a latitude reference point are configured or pre-configured by the network for each zone.

The UE 1 determines the at least one DRX configuration according to the cell or the cell ID and the second correspondence. If the UE 1 determines the plurality of DRX configurations, the UE 1 determines one DRX configuration from the DRX configurations. For example, the UE 1 randomly determines one DRX configuration from the DRX configurations, or the UE 1 determines one DRX configuration from the DRX configurations according to the type (such as the periodic or non-periodic service), the cycle, or the priority of the received service.

In step 202, the first DRX configuration of the first UE is determined according to the recommended DRX configuration.

In some embodiments, if the recommended DRX configuration is determined in the manner 3, the operation that the first DRX configuration of the first UE is determined according to the recommended DRX configuration includes that: the recommended DRX configuration is taken as the first DRX configuration. In other words, if the recommended DRX configuration is determined in the manner 3, the recommended DRX configuration is the first DRX configuration.

If the recommended DRX configuration is determined in the manner 3, steps 202 and 203 may be replaced by that the data sent by the second UE is discontinuously received according to the recommended DRX configuration.

Figure 9:
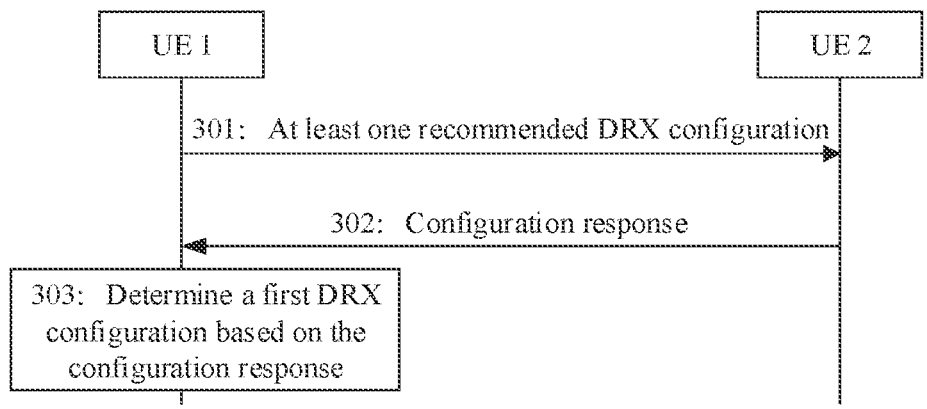
FIG. 9 is a schematic flowchart of a method for determining a first DRX configuration according to an embodiment of the present disclosure.

FIG. 9 is a schematic flowchart of a method for determining the first DRX configuration according to an embodiment of the present disclosure. As shown in FIG. 9, the operation that the first DRX configuration of the first UE is determined according to the recommended DRX configuration includes the following steps.

In step 301, at least one recommended DRX configuration is sent to the second UE.

That is, the first UE determines the at least one recommended DRX configuration according to the above method for determining the recommended DRX configuration, and provides the determined at least one recommended DRX configuration for the second UE to determine the first DRX configuration.

Optionally, responsive to there is a connection to another UE, the at least one recommended DRX configuration is sent to the second UE.

Optionally, responsive to there is no connection to another UE, the at least one recommended DRX configuration is sent to the second UE.

In step 302, the configuration response from the second UE is received.

In some embodiments, the operation that the configuration response from the second UE is received includes that:

the first DRX configuration generated by the second UE according to the recommended DRX configuration and/or the second DRX configuration is received.

Specifically, the operation that the first DRX configuration generated by the second UE according to the recommended DRX configuration and/or the second DRX configuration is received includes that: responsive to the second UE determines that the recommended DRX configuration is available, the first DRX configuration generated by the second UE according to the recommended DRX configuration is received; responsive to the second UE determines that the recommended DRX configuration is unavailable, the first DRX configuration generated by the second UE according to the second DRX configuration is received; or the first DRX configuration generated by the second UE according to the recommended DRX configuration and the second DRX configuration is received.

It is to be noted that the first DRX configuration generated according to the recommended DRX configuration and the second DRX configuration may or may not be related to whether the recommended DRX configuration is available. In other words, the second UE may directly generate the first DRX configuration according to the recommended DRX configuration and the second DRX configuration, or generate the first DRX configuration according to the recommended DRX configuration responsive to it is determined that the recommended DRX configuration is available.

In some embodiments, the second DRX configuration is specified or pre-specified by the network device.

In some embodiments, the second UE may determine, by determining whether the length of the LDC or the SDC of the recommended DRX configuration can meet a service requirement of the second UE, whether the recommended DRX configuration is available. For example, whether the LDC or the SDC indicated by the recommended DRX configuration is less than a service cycle is determined. If the LDC or the SDC indicated by the recommended DRX configuration is less than the service cycle, the length of the LDC or the SDC of the recommended DRX configuration can meet the service requirement of the second UE, otherwise the length of the LDC or the SDC of the recommended DRX configuration cannot meet the service requirement of the second UE. Alternatively, if the LDC or the SDC indicated by the recommended DRX configuration is less than or equal to the service cycle, the length of the LDC or the SDC of the recommended DRX configuration can meet the service requirement of the second UE, otherwise the length of the LDC or the SDC of the recommended DRX configuration cannot meet the service requirement of the second UE.

In some embodiments, responsive to one recommended DRX configuration is sent to the second UE, the operation that the configuration response from the second UE is received includes that: responsive to the second UE determines that the recommended DRX configuration is available, a first response from the second UE is received. The first response is used to indicate that the recommended DRX configuration is available. For example, the first response includes identification information indicating that the recommended DRX configuration is available, or identification information indicating that the recommended DRX configuration is unavailable.

In some embodiments, responsive to a plurality of recommended DRX configurations are sent to the second UE, the operation that the configuration response from the second UE is received includes that: a second response of the second UE is received. The second response is used to indicate one target DRX configuration of the recommended DRX configurations. For example, the second response includes index information of the target DRX configuration, or does not include any index information. Herein, the target DRX configuration is the first DRX configuration.

In step 303, the first DRX configuration is determined according to the configuration response.

Specifically, if the configuration response is the first DRX configuration, the steps 302 and 303 may be replaced by that the first DRX configuration sent by the second UE is received.

If the configuration response is the first response, and it is determined according to the first response that the recommended DRX configuration is available, the recommended DRX configuration is the first DRX configuration. If it is determined that the recommended DRX configuration is unavailable, a DRX configuration specified or pre-specified by the network may be taken as the first DRX configuration, or the first DRX configuration is obtained according to implementation of the first UE or a standard.

If the configuration response is the second response, and if the second response contains the index information, the first DRX configuration is determined according to the index information. If the second response does not contain the index information, a DRX configuration specified or pre-specified by the network may be taken as the first DRX configuration, or the first DRX configuration is obtained according to implementation of the first UE or a standard.

For example, the configuration response may be sent to the first UE by using a PC5 RRC connection, a MAC control element (MAC CE), second SL control information, first SL control information, or a physical sidelink feedback channel (PSFCH).

In step 203, the data sent by the second UE is discontinuously received according to the first DRX configuration.

In some embodiments, the DRX configuration (including the recommended DRX configuration, the first DRX configuration, the second DRX configuration, and the another DRX configuration in the embodiments of the application) includes the at least one of the first parameter, the second parameter, the third parameter, the fourth parameter, the fifth parameter, or the sixth parameter.

The first parameter is used to indicate the first time length, and the first time length is the time length during which the first UE listens to the PSCCH and/or the PSSCH in the DRX cycle.

The second parameter is used to indicate the second time length, and the second time length is the time length during which the first UE needs to continuously listen to the PSCCH and/or the PSSCH after listening to the PSCCH and/or the PSSCH.

The third parameter is used to indicate the third time length and/or the first offset, and the third time length is the time length of the LDC, and the first offset is the time offset relative to the time-domain reference point 1.

The fourth parameter is used to indicate the second offset, and the second offset is the timeslot-level offset of the LDC and/or the timeslot-level offset of the SDC.

The fifth parameter is used to indicate the fourth time length, and the fourth time length is the time length of the SDC.

The sixth parameter is used to indicate the first cycle quantity, and the first UE fails to listen to the PSCCH and/or the PSSCH in the SDC indicated by the first cycle quantity, and is ready to enter the LDC.

For a specific implementation process, reference may be made to FIG. 7 and its corresponding text. Details are not described herein again.

According to the above technical solutions, the first UE can determine the first DRX configuration according to the recommended DRX configuration. In this way, responsive to the first UE discontinuously receives data of different second UEs as the receiving end, the first UE can limit the selectable DRX configuration to the small range. This can resolve the problem that different UEs specify different DRX configurations for the first UE, thereby preventing the first UE from being always in the on-duration state, and reducing the energy consumption.

Figure 10:
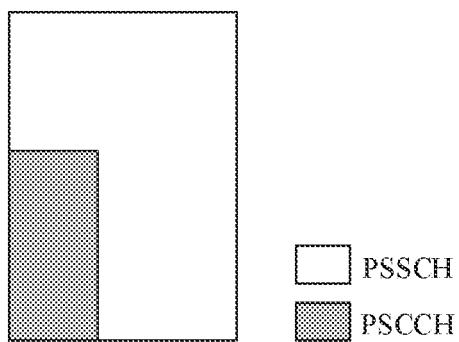
FIG. 10 is a schematic structural diagram of a physical layer of an SL in new radio (NR)

FIG. 10 is a schematic structural diagram of a physical layer of an SL in NR. As shown in FIG. 10, the physical layer includes the PSCCH and the PSSCH. The PSCCH is configured to transmit the first SL control information. The PSSCH is configured to carry data and the second SL control information. The PSCCH and the PSSCH are sent in a same timeslot. The first SL control information mainly contains a field related to resource listening. This makes it convenient for another UE to obtain a time-frequency resource indicated by the first SL control information after decoding the first SL control information, so as to exclude a corresponding resource in a resource selection process and avoid a resource collision. The second SL control information mainly includes a field related to data demodulation, which makes it convenient for another UE to demodulate the data in the corresponding PSSCH.

In a practical application, the UE 2 sends the configuration response to the UE 1 by using the PC5-RRC connection, the MAC CE, the second SL control information, the first SL control information, or the PSFCH. The UE 1 performs DRX according to the received DRX configuration.

The UE 1 is connected to another UE in a unicast or multicast manner, and the UE 1 is used as the receiving end. In a practical application, the unicast or multicast connection is the PC5 RRC connection.

In some embodiments, responsive to the UE 1 sends the recommended DRX configuration to the UE 2, the recommended DRX configuration may be carried by the PC5-RRC connection, the MAC CE, or the second SL control information.

Figure 11:
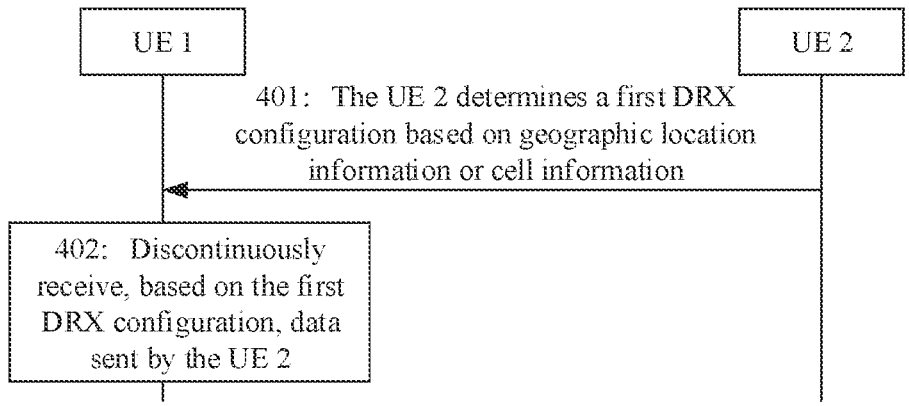
FIG. 11 is a third schematic flowchart of an SL parameter configuration method according to an embodiment of the present disclosure.

FIG. 11 is a third schematic flowchart of the SL parameter configuration method according to the embodiments of the application. As shown in FIG. 11, the SL parameter configuration method includes the following steps.

In step 401, the first DRX configuration determined by the second UE according to the geographic location information or the cell information is received.

In some embodiments, the operation that the first DRX configuration determined by the second UE according to the geographic location information or the cell information is received includes that: the first DRX configuration found by the second UE in the first correspondence according to the geographic location information is received; or the first DRX configuration found by the second UE in the second correspondence according to the cell information is received. The first correspondence includes the correspondence between the geographic location information and the DRX configuration, and the second correspondence includes the correspondence between the cell information and the DRX configuration.

In a practical application, the preset configuration rule is that the second UE determines the first DRX configuration according to its own geographic location or cell. In a practical application, a network may divide a geographic location into a plurality of geographical zones in advance, and then specify at least one DRX configuration for each geographical zone. A geographical zone of the second UE is determined according to the geographic location of the second UE, which is represented by a zone or a zone ID. Then at least one corresponding DRX configuration is determined according to the zone or the zone ID. If a plurality of DRX configurations are determined, one of the DRX configurations is determined as the first DRX configuration. The network may divide the cell into the plurality of cell groups in advance, and then specify the at least one DRX configuration for each cell group. The cell group of the second UE is determined according to the cell information of the second UE, which is represented by the cell group or the cell group ID. Then the at least one DRX configuration is determined according to the cell group or the cell group ID. If the plurality of DRX configurations are determined, one of the DRX configurations is determined as the first DRX configuration. The network may alternatively specify at least one DRX configuration for a cell directly. Then the second UE determines the at least one corresponding DRX configuration according to its own cell or cell ID. If the plurality of DRX configurations are determined, one of the DRX configurations is determined as the first DRX configuration.

For example, the UE 2 determines the at least one DRX configuration according to the first correspondence. The first correspondence includes the correspondence between the geographical zone or the zone ID and the at least one DRX configuration. The second correspondence includes the correspondence between the cell or the cell ID and the at least one DRX configuration. The above DRX configuration includes the at least one of the first parameter, the second parameter, the third parameter, the fourth parameter, the fifth parameter, or the fifth parameter. The first correspondence and the second correspondence are configured or pre-configured by the network.

Further, the UE 2 first determines its own geographic location according to the positioning system, determines its own geographical zone according to its own geographic location, and then determines the at least one DRX configuration according to the zone or the zone ID and the first correspondence. If the UE 2 determines the plurality of DRX configurations, the UE 2 determines one DRX configuration from the DRX configurations. For example, the UE 2 determines one DRX configuration from the DRX configurations according to its own service type (periodic or non-periodic service), service cycle, or service priority, or the UE 2 randomly determines one DRX configuration from the DRX configurations. The division information of the above geographical zone, for example, the length, the width, the absolute or relative offsets of the longitude and the latitude, the precision, and the latitude reference point are configured or pre-configured by the network for each zone.

The UE 2 determines the at least one DRX configuration according to the cell or the cell ID and the second correspondence. If the UE 2 determines the plurality of DRX configurations, the UE 2 determines one DRX configuration from the DRX configurations. For example, the UE 2 determines one DRX configuration from the DRX configurations according to its own service type (periodic or non-periodic service), service cycle, or service priority, or the UE 2 randomly determines one DRX configuration from the DRX configurations.

In a practical application, the UE 2 sends the determined first DRX configuration to the UE 1 by using the PC5 RRC connection, the MAC CE, the second SL control information, the first SL control information, or the PSFCH. The UE 1 performs DRX according to the received first DRX configuration.

In step 402, the data sent by the second UE is discontinuously received according to the first DRX configuration.

In some embodiments, the DRX configuration (including the recommended DRX configuration, the first DRX configuration, the second DRX configuration, and the another DRX configuration in the embodiments of the application) includes the at least one of the first parameter, the second parameter, the third parameter, the fourth parameter, the fifth parameter, or the sixth parameter.

The first parameter is used to indicate the first time length, and the first time length is the time length during which the first UE listens to the PSCCH and/or the PSSCH in the DRX cycle.

The second parameter is used to indicate the second time length, and the second time length is a time length during which the first UE needs to continuously listen to the PSCCH and/or the PSSCH after listening to the PSCCH and/or the PSSCH.

The third parameter is used to indicate the third time length and/or the first offset, and the third time length is the time length of the LDC, and the first offset is the time offset relative to the time-domain reference point 1.

The fourth parameter is used to indicate the second offset, and the second offset is the timeslot-level offset of the LDC and/or the timeslot-level offset of the SDC.

The fifth parameter is used to indicate the fourth time length, and the fourth time length is the time length of the SDC.

The sixth parameter is used to indicate the first cycle quantity, and the first UE fails to listen to the PSCCH and/or the PSSCH in the SDC indicated by the first cycle quantity, and is ready to enter the LDC.

For a specific implementation process, reference may be made to FIG. 7 and its corresponding text. Details are not described herein again.

According to the above technical solutions, the correspondence between the geographical zone or the cell and the at least one DRX configuration is preset, and the first DRX configuration is determined according to the geographic location or the cell information of the second UE. In this way, the second UE and the first UE that are in a same geographical zone or a same cell can be provided with a same DRX configuration or similar DRX configurations, and the selectable DRX configuration is limited to the small range. This can resolve the problem that different UEs specify different DRX configurations for the first UE, thereby preventing the first UE from always being in the on-duration state, and reducing the energy consumption.

Figure 12:
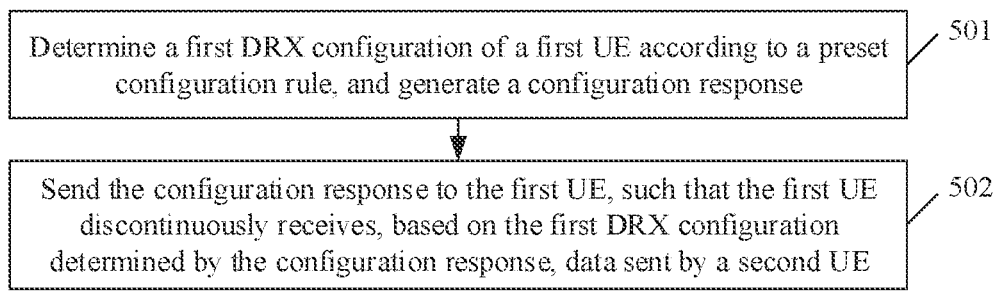
FIG. 12 is a fourth schematic flowchart of an SL parameter configuration method according to an embodiment of the present disclosure.

According to a same inventive concept, the embodiments of the application further provide another SL parameter configuration method, applied to a second UE. FIG. 12 is a fourth schematic flowchart of the SL parameter configuration method according to the embodiments of the application. As shown in FIG. 12, the SL parameter configuration method includes the following steps.

In step 501, a first DRX configuration of a first UE is determined according to a preset configuration rule, and a configuration response is generated.

It is to be noted that the preset configuration rule is used to limit a selection range of DRX configuration information of the first UE. The preset configuration rule is used to pre-plan a DRX configuration range to limit a selectable DRX configuration to a small range. In this way, responsive to the first UE performs DRX for another UE as a receiving end, the first UE can select the first DRX configuration in a small DRX configuration range. This avoids a case that the first UE is continuously in a listening state and fails to enter a dormant state because different UEs specify different DRX configurations for the first UE. In this way, it is ensured that the first UE has a sufficient period of dormancy, thus reducing an energy consumption of the first UE.

In a practical application, the preset configuration rule may be any rule that limits a DRX configuration selection range.

In some embodiments, the operation that the first DRX configuration of the first UE is determined according to the preset configuration rule, and the configuration response is generated includes that: at least one recommended DRX configuration of the first UE is received; and the first DRX configuration of the first UE is determined according to the recommended DRX configuration, and the configuration response is generated.

Herein, the preset configuration rule is that the second UE (also referred to as a UE 2) generates the first DRX configuration according to the recommended DRX configuration of the first UE (also referred to as a UE 1), the second UE sends the configuration response to the first UE, and the first UE performs DRX according to the first DRX configuration. The recommended DRX configuration of the first UE may be specified or pre-specified by a network device for the first UE, or the recommended DRX configuration depends on implementation of the first UE. For example, responsive to the first UE is connected to another UE, the recommended DRX configuration is obtained according to a DRX configuration corresponding to the connection.

It is to be noted that the first UE is used as the receiving end, and the second UE is used as a transmitting end. The receiving end can discontinuously receive data from a plurality of transmitting ends, in other words, the first UE corresponds to at least one second UE. A DRX configuration corresponding to each connection between the first UE and the second UE can be determined using the parameter configuration method provided in the embodiments of the application.

In some embodiments, the operation that the first DRX configuration of the first UE is determined according to the preset configuration rule, and the configuration response is generated includes that: a recommended DRX configuration of the first UE is received; the recommended DRX configuration is sent to the network device; the first DRX configuration issued by the network device is received; and the first DRX configuration is taken as the configuration response.

Herein, the preset configuration rule is that the second UE reports the recommended DRX configuration to the network device, and the network device determines the first DRX configuration according to the recommended DRX configuration, or the network device specifies the first DRX configuration according to an actual communication requirement.

For example, the network device determines that the recommended DRX configuration is available, and generates the first DRX configuration according to the recommended DRX configuration; the network device determines that the recommended DRX configuration is unavailable, and generates the first DRX configuration according to a second DRX configuration; the first DRX configuration is generated according to the recommended DRX configuration and a second DRX configuration; or the first DRX configuration is generated according to a second DRX configuration.

In some embodiments, the operation that the first DRX configuration of the first UE is determined according to the preset configuration rule, and the configuration response is generated includes that: the first DRX configuration is determined according to geographic location information or cell information of the second UE; and the first DRX configuration is taken as the configuration response.

Herein, the preset configuration rule is that the second UE determines the first DRX configuration according to its own geographic location or cell.

In this way, the preset configuration rule is used to pre-plan the DRX configuration range to limit the selectable DRX configuration to the small range. Responsive to the first UE performs DRX for another UE as the receiving end, the first UE can select the first DRX configuration in the small DRX configuration range. This avoids the case that the first UE is continuously in the listening state and fails to enter the dormant state because different UEs specify different DRX configurations for the first UE. In this way, it is ensured that the first UE has the sufficient period of dormancy, thus reducing the energy consumption of the first UE.

In step 502, the configuration response is sent to the first UE, such that the first UE discontinuously receives, according to the first DRX configuration determined by the configuration response, data sent by the second UE.

In some embodiments, a DRX configuration (including the recommended DRX configuration, the first DRX configuration, the second DRX configuration, and another DRX configuration in the embodiments of the application) includes at least one of a first parameter, a second parameter, a third parameter, a fourth parameter, a fifth parameter, or a sixth parameter.

The first parameter is used to indicate a first time length, and the first time length is a time length during which the first UE listens to a PSCCH and/or a PSSCH in a DRX cycle.

The second parameter is used to indicate a second time length, and the second time length is a time length during which the first UE needs to continuously listen to the PSCCH and/or the PSSCH after listening to the PSCCH and/or the PSSCH.

The third parameter is used to indicate a third time length and/or a first offset, the third time length is a time length of an LDC, and the first offset is a time offset relative to a time-domain reference point 1.

The fourth parameter is used to indicate a second offset, and the second offset is a timeslot-level offset of the LDC and/or a timeslot-level offset of an SDC.

The fifth parameter is used to indicate a fourth time length, and the fourth time length is a time length of the SDC.

The sixth parameter is used to indicate a first cycle quantity, and the first UE fails to listen to the PSCCH and/or the PSSCH in an SDC indicated by the first cycle quantity, and is ready to enter an LDC.

For a specific implementation process, reference may be made to FIG. 7 and its corresponding text. Details are not described herein again.

According to the above solutions, the DRX configuration range is pre-planned according to the preset configuration rule, and the selectable DRX configuration is limited to the small range. The first DRX configuration determined by the second UE according to the preset configuration rule can resolve a problem that different UEs specify different DRX configurations for the first UE, thereby preventing the first UE from being always in an on-duration state, and reducing the energy consumption.

Figure 13:
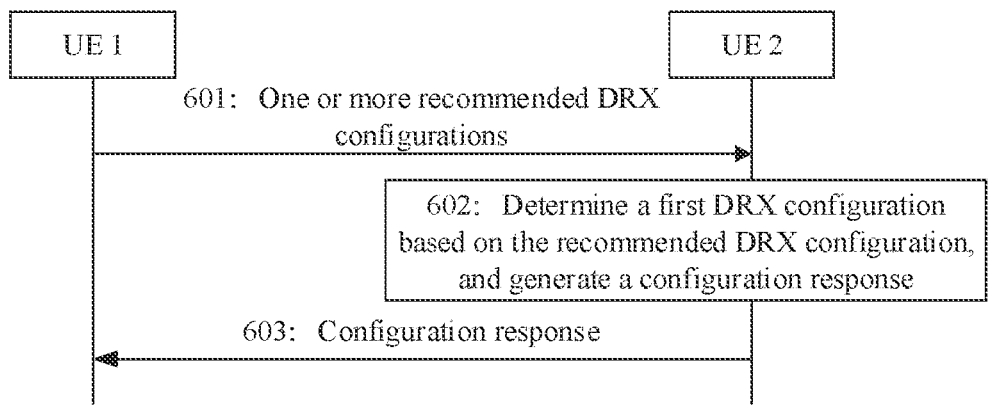
FIG. 13 is a fifth schematic flowchart of an SL parameter configuration method according to an embodiment of the present disclosure.

The following further describes, by using an example, how to determine the first DRX configuration in the embodiments of the application. FIG. 13 is a fifth schematic flowchart of the SL parameter configuration method according to the embodiments of the application. As shown in FIG. 13, the SL parameter configuration method includes the following steps.

In step 601, the at least one recommended DRX configuration of the first UE is received.

It is to be noted that for a method for generating the recommended DRX configuration, reference may be made to the above embodiment corresponding to the first UE, and details are not described herein again.

In step 602, the first DRX configuration of the first UE is determined according to the recommended DRX configuration, and the configuration response is generated.

In some embodiments, responsive to one recommended DRX configuration sent by the first UE is received, the operation that the first DRX configuration of the first UE is determined according to the recommended DRX configuration, and the configuration response is generated includes that: the first DRX configuration is generated according to the recommended DRX configuration and/or the second DRX configuration; and the first DRX configuration is taken as the configuration response.

Specifically, the operation that the first DRX configuration is generated according to the recommended DRX configuration and/or the second DRX configuration includes that: responsive to it is determined that the recommended DRX configuration is available, the first DRX configuration is generated according to the recommended DRX configuration; responsive to it is determined that the recommended DRX configuration is unavailable, the first DRX configuration is generated according to the second DRX configuration; or the first DRX configuration is generated according to the recommended DRX configuration and the second DRX configuration.

It is to be noted that the first DRX configuration generated according to the recommended DRX configuration and the second DRX configuration may or may not be related to whether the recommended DRX configuration is available. In other words, the second UE may directly generate the first DRX configuration according to the recommended DRX configuration and the second DRX configuration, or generate the first DRX configuration according to the recommended DRX configuration responsive to it is determined that the recommended DRX configuration is available.

In some embodiments, the second DRX configuration is specified or pre-specified by the network device.

In some embodiments, the second UE may determine, by determining whether the length of the LDC or the SDC of the recommended DRX configuration can meet a service requirement of the UE 2, whether the recommended DRX configuration is available. For example, whether the LDC or the SDC indicated by the recommended DRX configuration is less than a service cycle is determined. If the LDC or the SDC indicated by the recommended DRX configuration is less than the service cycle, the length of the LDC or the SDC of the recommended DRX configuration can meet the service requirement of the UE 2, otherwise the length of the LDC or the SDC of the recommended DRX configuration cannot meet the service requirement of the UE 2. Alternatively, if the LDC or the SDC indicated by the recommended DRX configuration is less than or equal to the service cycle, the length of the LDC or the SDC of the recommended DRX configuration can meet the service requirement of the UE 2, otherwise the length of the LDC or the SDC of the recommended DRX configuration cannot meet the service requirement of the UE 2.

In some other embodiments, responsive to one recommended DRX configuration sent by the first UE is received, the operation that the first DRX configuration of the first UE is determined according to the recommended DRX configuration, and the configuration response is generated includes that: responsive to it is determined that the recommended DRX configuration is available, a first response is generated, and the first response is taken as the configuration response. The first response is used to indicate that the recommended DRX configuration is available. For example, the first response includes identification information indicating that the recommended DRX configuration is available, or identification information indicating that the recommended DRX configuration is unavailable.

In some other embodiments, responsive to a plurality of recommended DRX configurations sent by the first UE are received, the operation that the first DRX configuration of the first UE is determined according to the recommended DRX configuration, and the configuration response is generated includes that: one target DRX configuration is determined from the recommended DRX configurations, a second response is generated, and the second response is taken as the configuration response. The second response is used to indicate the one target DRX configuration of the plurality of recommended DRX configurations. For example, the second response includes index information of the target DRX configuration, or does not include any index information. Herein, the target DRX configuration is the first DRX configuration.

In step 603, the configuration response is sent to the first UE.

In the embodiments of the present disclosure, after receiving the configuration response, the first UE discontinuously receives, according to the first DRX configuration determined by the configuration response, the data sent by the second UE.

Specifically, if the configuration response is the first DRX configuration, the step 602 may be replaced by that the first DRX configuration of the first UE is determined according to the recommended DRX configuration, and the step 603 may be replaced by that the first DRX configuration is sent to the first UE.

If the configuration response is the first response, and it is determined according to the first response that the recommended DRX configuration is available, the recommended DRX configuration is the first DRX configuration. If it is determined that the recommended DRX configuration is unavailable, a DRX configuration specified or pre-specified by a network may be taken as the first DRX configuration, or the first DRX configuration is obtained according to implementation of the first UE or a standard.

If the configuration response is the second response, and if the second response contains the index information, the first DRX configuration is determined according to the index information. If the second response does not contain the index information, a DRX configuration specified or pre-specified by a network may be taken as the first DRX configuration, or the first DRX configuration is obtained according to implementation of the first UE or a standard.

According to the above technical solutions, the first UE sends the recommended DRX configuration to the second UE, and the second UE determines the first DRX configuration according to the recommended configuration. In this way, the selectable DRX configuration of the second UE can be limited to the small range. This can resolve the problem that different UEs specify different DRX configurations for the first UE, thereby preventing the first UE from always being in the on-duration state, and reducing the energy consumption.

Figure 14:
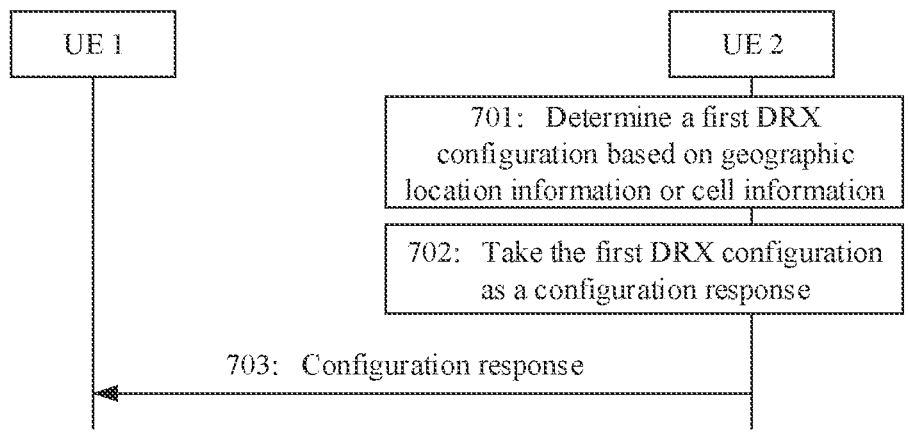
FIG. 14 is a sixth schematic flowchart of an SL parameter configuration method according to an embodiment of the present disclosure.

FIG. 14 is a sixth schematic flowchart of the SL parameter configuration method according to the embodiments of the application. As shown in FIG. 14, the SL parameter configuration method includes the following steps.

In step 701, the first DRX configuration is determined according to the geographic location information or the cell information of the second UE.

In some embodiments, the operation that the first DRX configuration is determined according to the geographic location information or the cell information of the second UE includes that: at least one corresponding DRX configuration is found in a first correspondence according to the geographic location information, and the first DRX configuration is determined from the at least one DRX configuration; or at least one corresponding DRX configuration is found in a second correspondence according to the cell information, and the first DRX configuration is determined from the at least one DRX configuration. The first correspondence includes a correspondence between the geographic location information and the DRX configuration, and the second correspondence includes a correspondence between the cell information and the DRX configuration.

In some embodiments, the operation that the first DRX configuration is determined from the at least one DRX configuration includes that: one DRX configuration is selected from the at least one DRX configuration as the first DRX configuration according to a type, a cycle, or a priority of a sent service; or one DRX configuration is randomly selected from the at least one DRX configuration as the first DRX configuration.

In a practical application, a network may divide a geographic location into a plurality of geographical zones in advance, and then specify at least one DRX configuration for each geographical zone. A geographical zone of the second UE is determined according to the geographic location of the second UE, which is represented by a zone or a zone ID. Then at least one corresponding DRX configuration is determined according to the zone or the zone ID. If a plurality of DRX configurations are determined, one of the DRX configurations is determined as the first DRX configuration. The network may divide a cell into a plurality of cell groups in advance, and then specify at least one DRX configuration for each cell group. A cell group of the second UE is determined according to the cell information of the second UE, which is represented by a cell group or a cell group ID. Then at least one corresponding DRX configuration is determined according to the cell group or the cell group ID. If a plurality of DRX configurations are determined, one of the DRX configurations is determined as the first DRX configuration. The network may alternatively specify at least one DRX configuration for a cell directly. Then the second UE determines at least one corresponding DRX configuration according to its own cell or cell ID. If a plurality of DRX configurations are determined, one of the DRX configurations is determined as the first DRX configuration.

For example, the UE 2 determines the at least one DRX configuration according to the first correspondence. The first correspondence includes a correspondence between the geographical zone or the zone ID and the at least one DRX configuration. The second correspondence includes a correspondence between the cell or the cell ID and the at least one DRX configuration. The above DRX configuration includes the at least one of the first parameter, the second parameter, the third parameter, the fourth parameter, the fifth parameter, or the fifth parameter. The first correspondence and the second correspondence are configured or pre-configured by the network.

Further, the UE 2 first determines its own geographic location according to the positioning system, determines its own geographical zone according to its own geographic location, and then determines the at least one DRX configuration according to the zone or the zone ID and the first correspondence. If the UE 2 determines the plurality of DRX configurations, the UE 2 determines one DRX configuration from the DRX configurations. For example, the UE 2 determines one DRX configuration from the DRX configurations according to its own service type (periodic or non-periodic service), service cycle, or service priority, or the UE 2 randomly determines one DRX configuration from the DRX configurations. Division information of the above geographical zone, for example, a length, a width, absolute or relative offsets of a longitude and a latitude, precision, and a latitude reference point are configured or pre-configured by the network for each zone.

The UE 2 determines the at least one DRX configuration according to the cell or the cell ID and the second correspondence. If the UE 2 determines the plurality of DRX configurations, the UE 2 determines one DRX configuration from the DRX configurations. For example, the UE 2 determines one DRX configuration from the DRX configurations according to its own service type (periodic or non-periodic service), service cycle, or service priority, or the UE 2 randomly determines one DRX configuration from the DRX configurations.

In a practical application, the UE 2 sends the determined DRX configuration to the UE 1 by using a PC5 RRC connection, a MAC CE, second SL control information, first SL control information, or a PSFCH. The UE 1 performs DRX according to the received DRX configuration.

In step 702, the first DRX configuration is taken as the configuration response.

In step 703, the configuration response is sent to the first UE.

In the embodiments of the present disclosure, after receiving the configuration response, the first UE discontinuously receives, according to the first DRX configuration determined by the configuration response, the data sent by the second UE.

Specifically, if the configuration response is the first DRX configuration, the steps 702 and 703 may be replaced by that the first DRX configuration is sent to the first UE.

According to the above technical solutions, the correspondence between the geographical zone or the cell and the at least one DRX configuration is preset, and the first DRX configuration is determined according to the geographic location or the cell information of the second UE. In this way, the second UE and the first UE that are in a same geographical zone or a same cell can be provided with a same DRX configuration or similar DRX configurations, and the selectable DRX configuration is limited to the small range. This can resolve the problem that different UEs specify different DRX configurations for the first UE, thereby preventing the first UE from always being in the on-duration state, and reducing the energy consumption.

Figure 15:
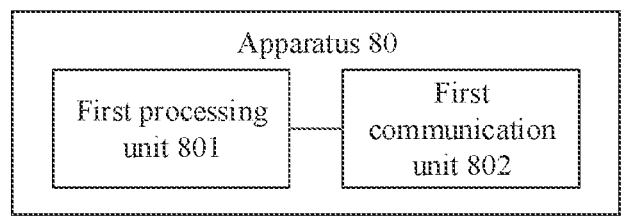
FIG. 15 is a first schematic structural diagram of an SL parameter configuration apparatus according to an embodiment of the present disclosure.

According to a same inventive concept, the embodiments of the application further provide an SL parameter configuration apparatus, applied to a first UE. FIG. 15 is a first schematic structural diagram of the SL parameter configuration apparatus according to the embodiments of the application. As shown in FIG. 15, the apparatus 80 includes a first processing unit 801 and a first communication unit 802.

The first processing unit 801 is configured to determine a first DRX configuration of the first UE according to a preset configuration rule.

The first communication unit 802 is configured to discontinuously receive, according to the first DRX configuration, data sent by a second UE.

In some embodiments, the first processing unit 801 is configured to determine a recommended DRX configuration of the first UE, and determine the first DRX configuration of the first UE according to the recommended DRX configuration.

In some embodiments, the first processing unit 801 is configured to: responsive to there is at least one connection between the first UE and at least one another UE, determine the recommended DRX configuration according to at least one DRX configuration corresponding to the at least one connection.

In some embodiments, the first processing unit 801 is configured to: responsive to there is one connection, determine a target parameter of a corresponding DRX configuration as a target parameter of the recommended DRX configuration; responsive to there are at least two connections, determine a target parameter of one of at least two corresponding DRX configurations as a target parameter of the recommended DRX configuration; or responsive to there are at least two connections, determine a target parameter of the recommended DRX configuration according to at least two target parameters of at least two corresponding DRX configurations.

In some embodiments, the first processing unit 801 is configured to: determine a maximum value of the at least two target parameters as the target parameter of the recommended DRX configuration; determine a minimum value of the at least two target parameters as the target parameter of the recommended DRX configuration; determine an average value of the at least two target parameters as the target parameter of the recommended DRX configuration; determine a parameter with a largest quantity in the at least two target parameters as the target parameter of the recommended DRX configuration; determine a greatest common divisor of the at least two target parameters as the target parameter of the recommended DRX configuration; or determine a least common multiple of the at least two target parameters as the target parameter of the recommended DRX configuration.

In some embodiments, the first processing unit 801 is configured to determine the recommended DRX configuration according to a network device configuration or pre-configuration.

In some embodiments, the first processing unit 801 is configured to determine the recommended DRX configuration according to geographic location information or cell information of the first UE.

In some embodiments, the first processing unit 801 is configured to: find at least one corresponding DRX configuration in a first correspondence according to the geographic location information of the first UE, and determine the recommended DRX configuration from the at least one DRX configuration; or find at least one corresponding DRX configuration in a second correspondence according to the cell information of the first UE, and determine the recommended DRX configuration from the at least one DRX configuration. The first correspondence includes a correspondence between the geographic location information and the DRX configuration, and the second correspondence includes a correspondence between the cell information and the DRX configuration.

In some embodiments, the first processing unit 801 is configured to: select one DRX configuration from the at least one DRX configuration as the recommended DRX configuration according to a type, a cycle, or a priority of a received service; or select one DRX configuration randomly from the at least one DRX configuration as the recommended DRX configuration.

In some embodiments, the first processing unit 801 is configured to determine the recommended DRX configuration as the first DRX configuration.

In some embodiments, the first communication unit 802 is configured to send at least one recommended DRX configuration to the second UE, and receive a configuration response from the second UE. The first processing unit 801 is configured to determine the first DRX configuration according to the configuration response.

In some embodiments, the first communication unit 802 is configured to receive the first DRX configuration generated by the second UE according to the recommended DRX configuration and/or a second DRX configuration.

In some embodiments, the first communication unit 802 is configured to: responsive to the second UE determines that the recommended DRX configuration is available, receive the first DRX configuration generated by the second UE according to the recommended DRX configuration; responsive to the second UE determines that the recommended DRX configuration is unavailable, receive the first DRX configuration generated by the second UE according to the second DRX configuration; or receive the first DRX configuration generated by the second UE according to the recommended DRX configuration and the second DRX configuration.

In some embodiments, the second DRX configuration is specified or pre-specified by a network device.

In some embodiments, the first communication unit 802 is configured to: responsive to the second UE determines that the recommended DRX configuration is available, receive a first response from the second UE. The first response is used to indicate that the recommended DRX configuration is available.

In some embodiments, the first communication unit 802 is configured to receive a second response of the second UE. The second response is used to indicate one target DRX configuration of the recommended DRX configurations.

In some embodiments, the first communication unit 802 is configured to receive the first DRX configuration determined by the second UE according to geographic location information or cell information.

In some embodiments, the first communication unit 802 is configured to: receive the first DRX configuration found by the second UE in a first correspondence according to the geographic location information; or receive the first DRX configuration found by the second UE in a second correspondence according to the cell information. The first correspondence includes a correspondence between the geographic location information and the DRX configuration, and the second correspondence includes a correspondence between the cell information and the DRX configuration.

In some embodiments, the DRX configuration includes at least one of a first parameter, a second parameter, a third parameter, a fourth parameter, a fifth parameter, or a sixth parameter.

The first parameter is used to indicate a first time length, and the first time length is a time length during which the first UE listens to a PSCCH and/or a PSSCH in a DRX cycle.

The second parameter is used to indicate a second time length, and the second time length is a time length during which the first UE needs to continuously listen to the PSCCH and/or the PSSCH after listening to the PSCCH and/or the PSSCH.

The third parameter is used to indicate a third time length and/or a first offset, the third time length is a time length of an LDC, and the first offset is a time offset relative to a time-domain reference point 1.

The fourth parameter is used to indicate a second offset, and the second offset is a timeslot-level offset of the LDC and/or a timeslot-level offset of an SDC.

The fifth parameter is used to indicate a fourth time length, and the fourth time length is a time length of the SDC.

The sixth parameter is used to indicate a first cycle quantity, and the first UE fails to listen to the PSCCH and/or the PSSCH in an SDC indicated by the first cycle quantity, and is ready to enter an LDC.

According to the above apparatus, a DRX configuration range is pre-planned according to the preset configuration rule, and a selectable DRX configuration is limited to a small range. The first DRX configuration determined for the first UE according to the preset configuration rule can resolve a problem that different UEs specify different DRX configurations for the first UE, thereby preventing the first UE from being always in an on-duration state, and reducing an energy consumption.

Figure 16:
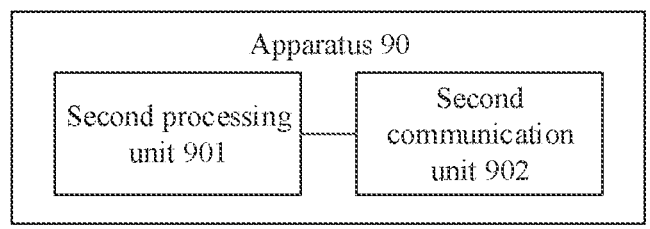
FIG. 16 is a second schematic structural diagram of an SL parameter configuration apparatus according to an embodiment of the present disclosure.

The embodiments of the application further provide another SL parameter configuration apparatus, applied to a second UE. FIG. 16 is a second schematic structural diagram of the SL parameter configuration apparatus according to the embodiments of the application. As shown in FIG. 16, the apparatus 90 includes a second processing unit 901 and a second communication unit 902.

The second processing unit 901 is configured to determine a first DRX configuration of a first UE according to a preset configuration rule, and generate a configuration response.

The second communication unit 902 is configured to send the configuration response to the first UE, such that the first UE discontinuously receives, according to the first DRX configuration determined by the configuration response, data sent by the second UE.

In some embodiments, the second communication unit 902 is configured to receive at least one recommended DRX configuration of the first UE. The second processing unit 901 is configured to determine the first DRX configuration of the first UE according to the recommended DRX configuration, and generate the configuration response.

In some embodiments, the second communication unit 902 is configured to receive one recommended DRX configuration sent by the first UE. The second processing unit 901 is configured to generate the first DRX configuration according to the recommended DRX configuration and/or a second DRX configuration, and determine the first DRX configuration as the configuration response.

In some embodiments, the second processing unit 901 is configured to: responsive to it is determined that the recommended DRX configuration is available, generate the first DRX configuration according to the recommended DRX configuration; responsive to it is determined that the recommended DRX configuration is unavailable, generate the first DRX configuration according to the second DRX configuration; or generate the first DRX configuration according to the recommended DRX configuration and the second DRX configuration.

In some embodiments, the second DRX configuration is specified or pre-specified by a network device.

In some embodiments, the second communication unit 902 is configured to receive one recommended DRX configuration sent by the first UE. The second processing unit 901 is configured to: responsive to it is determined that the recommended DRX configuration is available, generate a first response, and determine the first responder as the configuration response. The first response is used to indicate that the recommended DRX configuration is available.

In some embodiments, the second communication unit 902 is configured to receive a plurality of recommended DRX configurations sent by the first UE. The second processing unit 901 is configured to determine one target DRX configuration from the recommended DRX configurations, generate a second response, and determine the second response as the configuration response. The second response is used to indicate the one target DRX configuration of the plurality of recommended DRX configurations.

In some embodiments, the second communication unit 902 is configured to receive a recommended DRX configuration of the first UE, send the recommended DRX configuration to the network device, receive the first DRX configuration issued by the network device, and determine the first DRX configuration as the configuration response.

In some embodiments, the second processing unit 901 is configured to determine the first DRX configuration according to geographic location information or cell information of the second UE, and determine the first DRX configuration as the configuration response.

In some embodiments, the second processing unit 901 is configured to: find at least one corresponding DRX configuration in a first correspondence according to the geographic location information, and determine the first DRX configuration from the at least one DRX configuration; or find at least one corresponding DRX configuration in a second correspondence according to the cell information, and determine the first DRX configuration from the at least one DRX configuration. The first correspondence includes a correspondence between the geographic location information and the DRX configuration, and the second correspondence includes a correspondence between the cell information and the DRX configuration.

In some embodiments, the second processing unit 901 is configured to: select one DRX configuration from the at least one DRX configuration as the first DRX configuration according to a type, a cycle, or a priority of a sent service; or randomly select one DRX configuration from the at least one DRX configuration as the first DRX configuration.

In some embodiments, the DRX configuration includes at least one of a first parameter, a second parameter, a third parameter, a fourth parameter, a fifth parameter, or a sixth parameter.

The first parameter is used to indicate a first time length, and the first time length is a time length during which the first UE listens to a PSCCH and/or a PSSCH in a DRX cycle.

The second parameter is used to indicate a second time length, and the second time length is a time length during which the first UE needs to continuously listen to the PSCCH and/or the PSSCH after listening to the PSCCH and/or the PSSCH.

The third parameter is used to indicate a third time length and/or a first offset, the third time length is a time length of an LDC, and the first offset is a time offset relative to a time-domain reference point 1.

The fourth parameter is used to indicate a second offset, and the second offset is a timeslot-level offset of the LDC and/or a timeslot-level offset of an SDC.

The fifth parameter is used to indicate a fourth time length, and the fourth time length is a time length of the SDC.

The sixth parameter is used to indicate a first cycle quantity, and the first UE fails to listen to the PSCCH and/or the PSSCH in an SDC indicated by the first cycle quantity, and is ready to enter an LDC.

According to the above apparatus, a DRX configuration range is pre-planned according to the preset configuration rule, and a selectable DRX configuration is limited to a small range. The first DRX configuration determined by the second UE according to the preset configuration rule can resolve a problem that different UEs specify different DRX configurations for the first UE, thereby preventing the first UE from being always in an on-duration state, and reducing an energy consumption.

Figure 17:
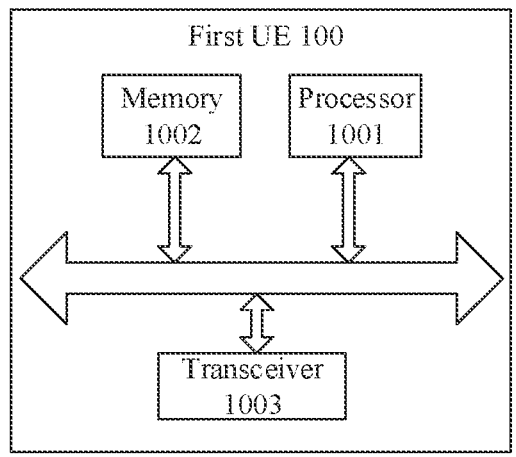
FIG. 17 is a schematic structural diagram of a first UE according to an embodiment of the present disclosure.

The embodiments of the application further provide a UE. FIG. 17 is a schematic structural diagram of a first UE according to an embodiment of the present disclosure. As shown in FIG. 17, the first UE 100 includes a processor 1001, and a memory 1002 configured to store a computer program that can run on the processor.

The processor 1001 is configured to run the computer program to perform the steps of the methods in the aforementioned embodiments. Optionally, the first UE 100 may further include a transceiver 1003, and the processor 1001 can control the transceiver 1003 to communicate with another UE.

The transceiver 1003 may include a transmitter and a receiver. The transceiver 1003 may further include at least one antenna.

Certainly, in a practical application, components of the first UE are coupled through a bus system. It can be understood that the bus system is configured to implement connection and communication between the components. The bus system includes a power bus, a control bus, and a status signal bus in addition to a data bus.

Figure 18:
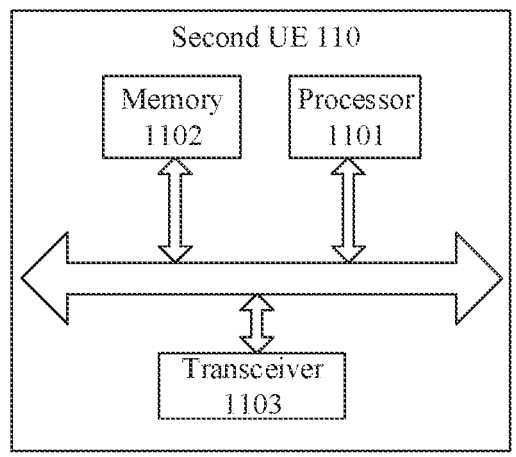
FIG. 18 is a schematic structural diagram of a second UE according to an embodiment of the present disclosure.

FIG. 18 is a schematic structural diagram of a second UE according to an embodiment of the present disclosure. As shown in FIG. 18, the second UE 110 includes a processor 1101, and a memory 1102 configured to store a computer program that can run on the processor.

The processor 1101 is configured to run the computer program to perform the steps of the methods in the aforementioned embodiments.

Optionally, the first UE 110 may further include a transceiver 1103, and the processor 1101 can control the transceiver 1103 to communicate with another UE. The transceiver 1103 may include a transmitter and a receiver. The transceiver 1103 may further include at least one antenna.

Certainly, in a practical application, components of the first UE are coupled through a bus system. It can be understood that the bus system is configured to implement connection and communication between the components. The bus system includes a power bus, a control bus, and a status signal bus in addition to a data bus.

Figure 19:
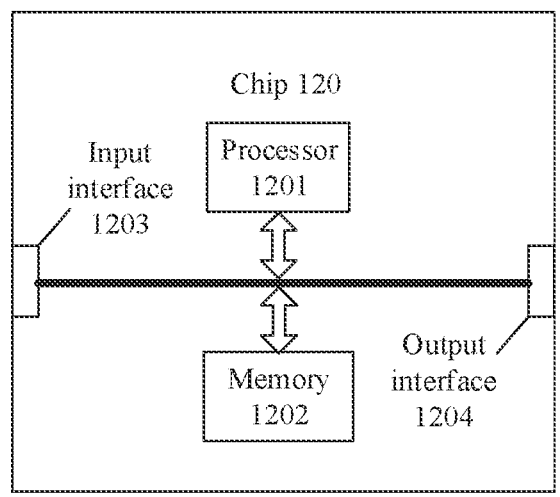
FIG. 19 is a schematic structural diagram of a chip according to an embodiment of the present disclosure.

The embodiments of the application further provide a chip. FIG. 19 is a schematic structural diagram of a chip according to an embodiment of the present disclosure. The chip 120 shown in FIG. 19 includes a processor 1201. The processor 1201 can call and run a computer program in a memory to implement the methods in the embodiments of the application. Optionally, as shown in FIG. 19, the chip 120 may further include the memory 1202. The processor 1201 can call and run the computer program in the memory 1202 to implement the methods in the embodiments of the application. The memory 1202 may be a component independent from the processor 1201 or may be integrated in the processor 1201. Optionally, the chip 120 may further include an input interface 1203. The processor 1201 can control the input interface 1203 to communicate with another device or chip, specifically, to obtain information or data sent by the another device or chip. Optionally, the chip 120 may further include an output interface 1204. The processor 1201 can control the output interface 1204 to communicate with another device or chip, specifically, to output information or data to the another device or chip.

Optionally, the chip may be applied to the first UE or the second UE in the embodiments of the application. The chip can implement a corresponding process implemented by the first UE or the second UE in each method in the embodiments of the application. For brevity, details are not described herein again. It is to be understood that the chip in this embodiment of the present disclosure may also be referred to as a system-level chip, a system chip, a chip system, a system on a chip, or the like.

Figure 20:
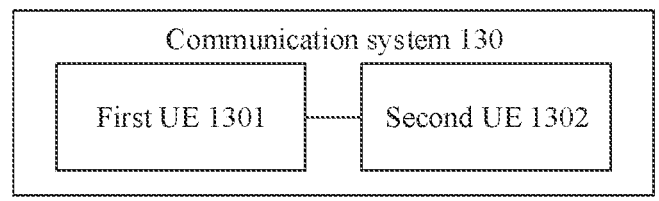
FIG. 20 is a schematic structural diagram of a communication system according to an embodiment of the present disclosure.

FIG. 20 is a schematic structural diagram of a communication system according to an embodiment of the present disclosure. As shown in FIG. 20, the communication system 130 includes a first UE 1301 and a second UE 1302.

The first UE 1301 is configured to realize corresponding functions realized by the first UE in the above methods, and the second UE 1302 is configured to realize corresponding functions realized by the second UE in the above methods. Details are not described herein again.

In a practical application, the first UE 1301 is a receiving end, and the second UE 1302 is a transmitting end. The communication system 130 may further include another UE connected to the first UE 1301.

It can be understood that the processor may be an integrated circuit (IC) chip capable of signal processing. During the implementation, the steps of each method may be performed by using an integrated logic circuit of hardware in a processor or by using instructions in a form of software. The processor may be a general-purpose processor, a digital signal processor (DSP), an application specific integrated circuit (ASIC), a field-programmable gate array (FPGA) or another programmable logic device, a discrete gate, a transistor logic device, a discrete hardware component, or the like. The processor can implement or execute the methods, steps and logical block diagrams disclosed in the embodiments of the present disclosure. The general-purpose processor may be a microprocessor, or the processor may also be any conventional processor. The steps of the methods disclosed with reference to the embodiments of the present disclosure may be directly executed by a hardware decoding processor, or executed by a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in a memory. The processor reads information in the memory, and completes the steps of the foregoing methods in combination with hardware in the processor.

It can be understood that the memory in the embodiments of the present disclosure may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM), which is used as an external cache. Through illustrative rather than restrictive description, RAMs of many forms are available, for example, a static RAM (SRAM), a dynamic RAM (DRAM), a synchronous DRAM (SDRAM), a double data rate SDRAM (DDR SDRAM), an enhanced SDRAM (ESDRAM), synchlink DRAM (SLDRAM), and a direct rambus RAM (DRRAM). It is to be noted that the memory involved in the systems and methods described in this specification is intended to include, but is not limited to, these memories and a memory of any other suitable type.

The embodiments of the application further provide a computer-readable storage medium for storing a computer program. Optionally, the computer-readable storage medium may be applied by the first UE or the second UE in the embodiments of the application. The computer-readable storage medium may implement a corresponding process implemented by the first UE or the second UE in each method in the embodiments of the application. For brevity, details are not described herein again.

Those of ordinary skill in the art may be aware that units and algorithm steps in examples described with reference to the embodiments disclosed in this specification can be implemented by electronic hardware or a combination of computer software and electronic hardware. Whether these functions are implemented by hardware or software depends on specific applications of the technical solutions and design constraints. A person skilled in the art may use different methods to implement the described functions for each specific application, but such implementation should not be considered to be beyond the scope of the present application.

A person skilled in the art can clearly understand that for convenience and brevity of description, reference may be made to corresponding processes in the foregoing method embodiments for specific working processes of the foregoing systems, apparatuses, and units. Details are not described herein again.

In several embodiments provided in the present disclosure, it is to be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate. Parts shown as units may or may not be physical units, which may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit.

If implemented in a form of a software functional unit and sold or used as a stand-alone product, functions may be stored in a computer-readable storage medium. According to such understanding, the technical solution in this application essentially, or the part contributing to the prior art, or some of the technical solutions may be embodied in a form of a software product. The computer software product is stored in a storage medium, and includes several instructions to enable a computer device (which may be a personal computer, a server, a network device, or the like) to execute all or some steps of the method according to the embodiments of this application.

The above descriptions are merely specific implementations of the application, but the protection scope of the application is not limited thereto. Any variation or replacement readily figured out by a person skilled in the art within the technical scope disclosed in the application shall fall within the protection scope of the application. Therefore, the protection scope of the present application should be subject to the protection scope of the claims.

The invention claimed is:

1. A sidelink (SL) parameter configuration method, applied to a first user equipment (UE), comprising:
   determining a recommended discontinuous reception (DRX) configuration of the first UE, the recommended DRX configuration depending on implementation of the first UE;
   sending the recommended DRX configurations to a second UE;
   receiving a configuration response from the second UE;
   determining a first DRX configuration of the first UE according to the configuration response; and
   discontinuously receiving, according to the first DRX configuration, data sent by the second UE,
   wherein determining the recommended DRX configuration of the first UE comprises:
   finding at least one corresponding DRX configuration in a first correspondence according to geographic location information of the first UE, and determining, according to a cycle or a priority of a received service, the recommended DRX configuration from the at least one DRX configuration; or
   finding at least one corresponding DRX configuration in a second correspondence according to cell ID of the first UE, and determining the recommended DRX configuration from the at least one DRX configuration;
   wherein the first correspondence comprises a correspondence between the geographic location information and the DRX configuration, and the second correspondence comprises a correspondence between the cell ID and the DRX configuration.

2. The method of claim 1, wherein the configuration response is sent by using a PC5 radio resource control (PC5 RRC) connection.

3. The method of claim 1, wherein the recommended DRX configuration is sent by using a PC5 radio resource control (PC5 RRC) connection.

4. The method of claim 1, wherein receiving the configuration response from the second UE comprises:
   receiving the first DRX configuration which is generated by the second UE according to at least one of the recommended DRX configuration or a second DRX configuration.

5. The method of claim 4, wherein the second DRX configuration is pre-configured or configured by a network device.

6. The method according to claim 1, wherein the DRX configuration comprises at least one of a first parameter, a second parameter, a third parameter, a fourth parameter, a fifth parameter, or a sixth parameter, wherein
   the first parameter is used to indicate a first time length, and the first time length is a time length during which the first UE listens to at least one of a physical sidelink control channel (PSCCH) or a physical sidelink shared channel (PSSCH);
   the second parameter is used to indicate a second time length, and the second time length is a time length during which the first UE needs to continuously listen to at least one of the PSCCH or the PSSCH after listening to at least one of the PSCCH or the PSSCH;
   the third parameter is used to indicate at least one of a third time length or a first offset, the third time length is a time length of a long DRX cycle (LDC), and the first offset is a time offset relative to a time-domain reference point 1; and
   the fourth parameter is used to indicate a second offset, and the second offset is a timeslot-level offset of at least one of the LDC or a short DRX cycle (SDC).

7. A sidelink (SL) parameter configuration method, applied to a second user equipment (UE), comprising:
   determining a first discontinuous reception (DRX) configuration of the first UE and generating a configuration response; and
   sending the configuration response to the first UE, such that the first UE discontinuously receives, according to the first DRX configuration determined by the configuration response, data sent by the second UE,
   wherein determining the first DRX configuration of the first UE comprises:
   finding at least one corresponding DRX configuration in a first correspondence according to geographic location information of the second UE, and determining, according to a cycle or a priority of a sent service, the first DRX configuration from the at least one DRX configuration; or
   finding at least one corresponding DRX configuration in a second correspondence according to cell ID of the second UE, and determining the first DRX configuration from the at least one DRX configuration;
   wherein the first correspondence comprises a correspondence between the geographic location information and the DRX configuration, and the second correspondence comprises a correspondence between the cell ID and the DRX configuration.

8. A first user equipment (UE) comprising a processor and a memory for storing a computer program capable of running on the processor, wherein the processor is configured to execute the computer program to perform operations of:
   determining a recommended discontinuous reception (DRX) configuration of the first UE, the recommended DRX configuration depending on implementation of the first UE;
   sending the recommended DRX configurations to a second UE;
   receiving a configuration response from the second UE;
   determining a first DRX configuration of the first UE according to the configuration response; and
   discontinuously receiving, according to the first DRX configuration, data sent by the second UE,
   wherein determining the recommended DRX configuration of the first UE comprises:

finding at least one corresponding DRX configuration in a first correspondence according to geographic location information of the first UE, and determining, according to a cycle or a priority of a received service, the recommended DRX configuration from the at least one DRX configuration; or finding at least one corresponding DRX configuration in a second correspondence according to cell ID of the first UE, and determining the recommended DRX configuration from the at least one DRX configuration;

wherein the first correspondence comprises a correspondence between the geographic location information and the DRX configuration, and the second correspondence comprises a correspondence between the cell ID and the DRX configuration.

9. The first UE of claim 8, wherein the configuration response is sent by using a PC5 radio resource control (PC5 RRC) connection.

10. The first UE of claim 8, wherein the recommended DRX configuration is sent by using a PC5 radio resource control (PC5 RRC) connection.

11. The first UE of claim 8, wherein receiving the configuration response from the second UE comprises:

receiving the first DRX configuration which is generated by the second UE according to at least one of the recommended DRX configuration or a second DRX configuration.

12. The first UE of claim 11, wherein the second DRX configuration is pre-configured or configured by a network device.

13. The first UE according to claim 8, wherein the DRX configuration comprises at least one of a first parameter, a second parameter, a third parameter, a fourth parameter, a fifth parameter, or a sixth parameter, wherein the first parameter is used to indicate a first time length, and the first time length is a time length during which the first UE listens to at least one of a physical sidelink control channel (PSCCH) or a physical sidelink shared channel (PSSCH);

the second parameter is used to indicate a second time length, and the second time length is a time length during which the first UE needs to continuously listen to at least one of the PSCCH or the PSSCH after listening to at least one of the PSCCH or the PSSCH;

the third parameter is used to indicate at least one of a third time length or a first offset, the third time length is a time length of a long DRX cycle (LDC), and the first offset is a time offset relative to a time-domain reference point 1; and the fourth parameter is used to indicate a second offset, and the second offset is a timeslot-level offset of at least one of the LDC or a short DRX cycle (SDC).

14. A second user equipment (UE), comprising a processor and a memory for storing a computer program capable of running on the processor, wherein the processor is configured to execute the computer program to perform operations of:

determining a first discontinuous reception (DRX) configuration of the first UE and generating a configuration response; and sending the configuration response to the first UE, such that the first UE discontinuously receives, according to the first DRX configuration determined by the configuration response, data sent by the second UE, wherein determining the first DRX configuration of the first UE comprises:

finding at least one corresponding DRX configuration in a first correspondence according to geographic location information of the second UE, and determining, according to a cycle or a priority of a sent service, the first DRX configuration from the at least one DRX configuration; or finding at least one corresponding DRX configuration in a second correspondence according to cell ID of the second UE, and determining the first DRX configuration from the at least one DRX configuration;

wherein the first correspondence comprises a correspondence between the geographic location information and the DRX configuration, and the second correspondence comprises a correspondence between the cell ID and the DRX configuration.

* * * * *